United States Patent
Kobayashi

(10) Patent No.: US 9,326,115 B2
(45) Date of Patent: Apr. 26, 2016

(54) INFORMATION PROCESSING SYSTEM, INFORMATION PROCESSING METHOD, MOBILE PHONE, SERVER, AND CONTROL METHOD AND CONTROL PROGRAM THEREOF

(71) Applicant: NEC Corporation, Tokyo (JP)

(72) Inventor: Yoshikazu Kobayashi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/382,417

(22) PCT Filed: Feb. 13, 2013

(86) PCT No.: PCT/JP2013/053350
§ 371 (c)(1),
(2) Date: Sep. 2, 2014

(87) PCT Pub. No.: WO2013/129102
PCT Pub. Date: Sep. 6, 2013

(65) Prior Publication Data
US 2015/0087356 A1    Mar. 26, 2015

(30) Foreign Application Priority Data

Mar. 2, 2012 (JP) .................................. 2012-046995

(51) Int. Cl.
*H04W 4/18* (2009.01)
*G06F 3/14* (2006.01)
(Continued)

(52) U.S. Cl.
CPC ............... *H04W 4/18* (2013.01); *G06F 3/1206* (2013.01); *G06F 3/1247* (2013.01);
(Continued)

(58) Field of Classification Search
CPC ................................ H04W 4/18; H04M 1/725
See application file for complete search history.

(56) References Cited

U.S. PATENT DOCUMENTS

2003/0137689 A1  7/2003  Bontempi
2006/0105816 A1* 5/2006  Hwang et al. .................. 455/566
(Continued)

FOREIGN PATENT DOCUMENTS

GB   2 365 599 A    2/2002
JP   2006-67368     3/2006
(Continued)

OTHER PUBLICATIONS

J. Kuwahara et al., "A Study on Remote Plug and Play of USB Equipment that Assumes Portable Terminal", IPSJ SIG Technical Report, vol. 2005, No. 113, pp. 181-186, Nov. 2005.
(Continued)

*Primary Examiner* — Leon Flores
(74) *Attorney, Agent, or Firm* — Finnegan, Henderson, Farabow, Garrett & Dunner LLP

(57) ABSTRACT

A system of this invention is directed to an information processing system that connects a mobile phone to an output device, and easily outputs data in a format processable by the output device. The information processing system includes a mobile phone, and a server. The mobile phone includes a determiner that, when an output device is connected via a communication interface, recognizes the output device and determines whether the mobile phone can output data in a format processable by the output device, a requester that, when the determiner determines that the mobile phone cannot output data processable by the output device, transmits a request to the server connected via a wireless communication network to supply the data in the format processable by the output device, a receiver that receives the data provided by the server, and a transmitter that transmits the data received by the receiver to the output device via the communication interface. The server transmits the data in the format processable by the output device to the mobile phone in response to the request from the requester.

20 Claims, 22 Drawing Sheets

(51) Int. Cl.
*H04M 1/725* (2006.01)
*G09G 5/00* (2006.01)
*G09G 5/12* (2006.01)
*G06F 3/12* (2006.01)

(52) U.S. Cl.
CPC ........... *G06F 3/1289* (2013.01); *G06F 3/1292* (2013.01); *G06F 3/14* (2013.01); *H04M 1/725* (2013.01); *G06F 3/122* (2013.01); *G06F 3/1204* (2013.01); *G06F 3/1228* (2013.01); *G09G 5/005* (2013.01); *G09G 5/12* (2013.01); *G09G 2360/02* (2013.01); *G09G 2370/022* (2013.01); *G09G 2370/06* (2013.01); *G09G 2370/16* (2013.01); *G09G 2370/20* (2013.01)

(56) References Cited

U.S. PATENT DOCUMENTS

| | | | |
|---|---|---|---|
| 2008/0059398 A1 | 3/2008 | Tsutsui | |
| 2008/0309961 A1 | 12/2008 | Aichi et al. | |
| 2009/0061841 A1* | 3/2009 | Chaudhri et al. | 455/420 |
| 2011/0222104 A1 | 9/2011 | Mohammad et al. | |

FOREIGN PATENT DOCUMENTS

| | | |
|---|---|---|
| JP | 2006-129468 | 5/2006 |
| JP | 2008-65546 | 3/2008 |
| JP | 2011-223506 | 11/2011 |
| WO | WO 02/103462 A2 | 12/2002 |

OTHER PUBLICATIONS

International Search Report mailed May 14, 2013.
Extended European Search Report mailed Oct. 1, 2015 by the European Patent Office in counterpart European Patent Application No. 13755632.0.

* cited by examiner

| DEVICE DESCRIPTOR | INTERFACE DESCRIPTOR | VENDER ID | PRODUCT ID |
|---|---|---|---|
| AAAAAA | XXXXX | ○○○○ | ●●● |
| BBBBBB | YYYYY | △△△△ | ▲▲▲▲ |
| CCCCCC | ZZZZZ | □□□□ | ■■■■ |
| ... | ... | ... | ... |

FIG. 7E

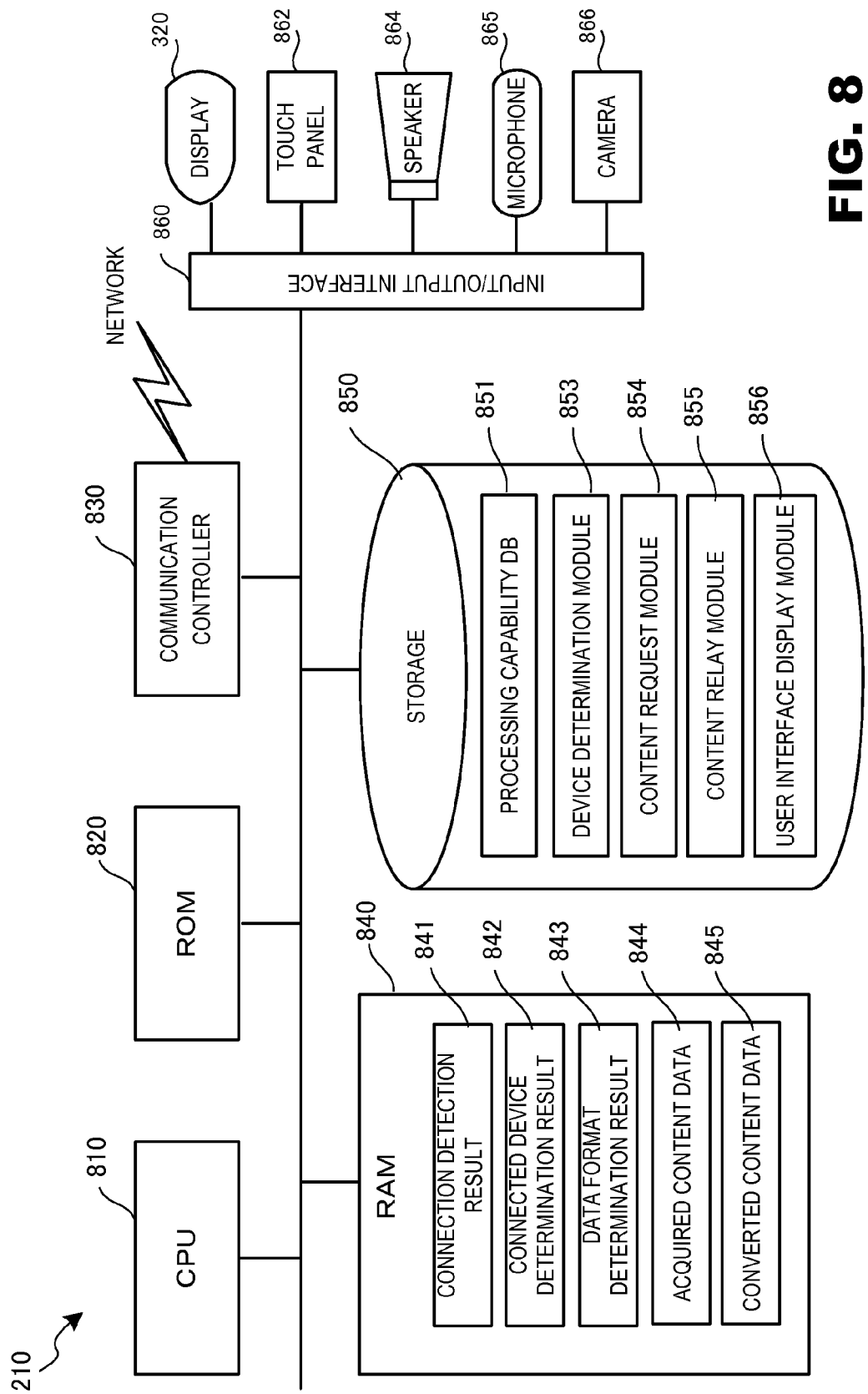

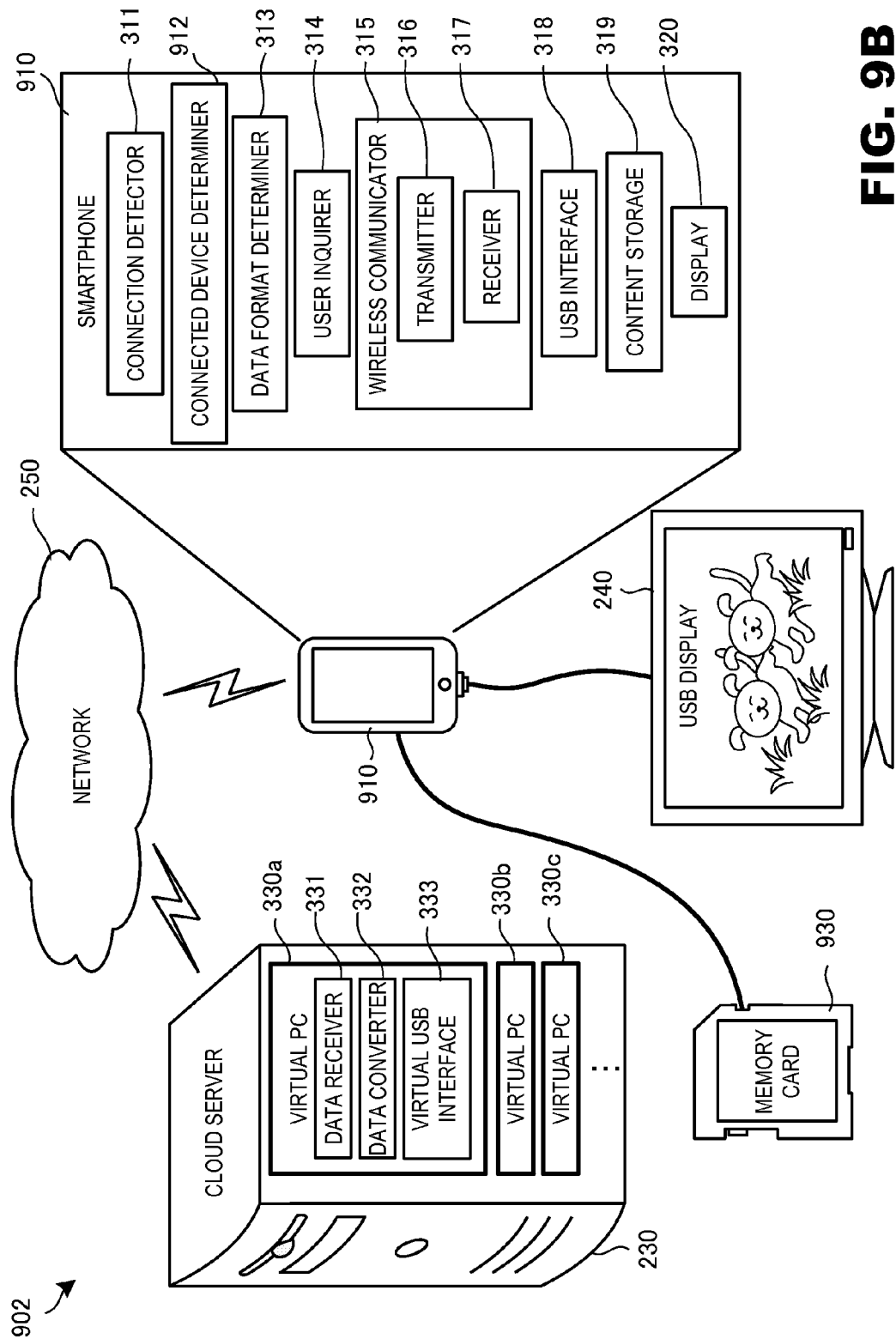

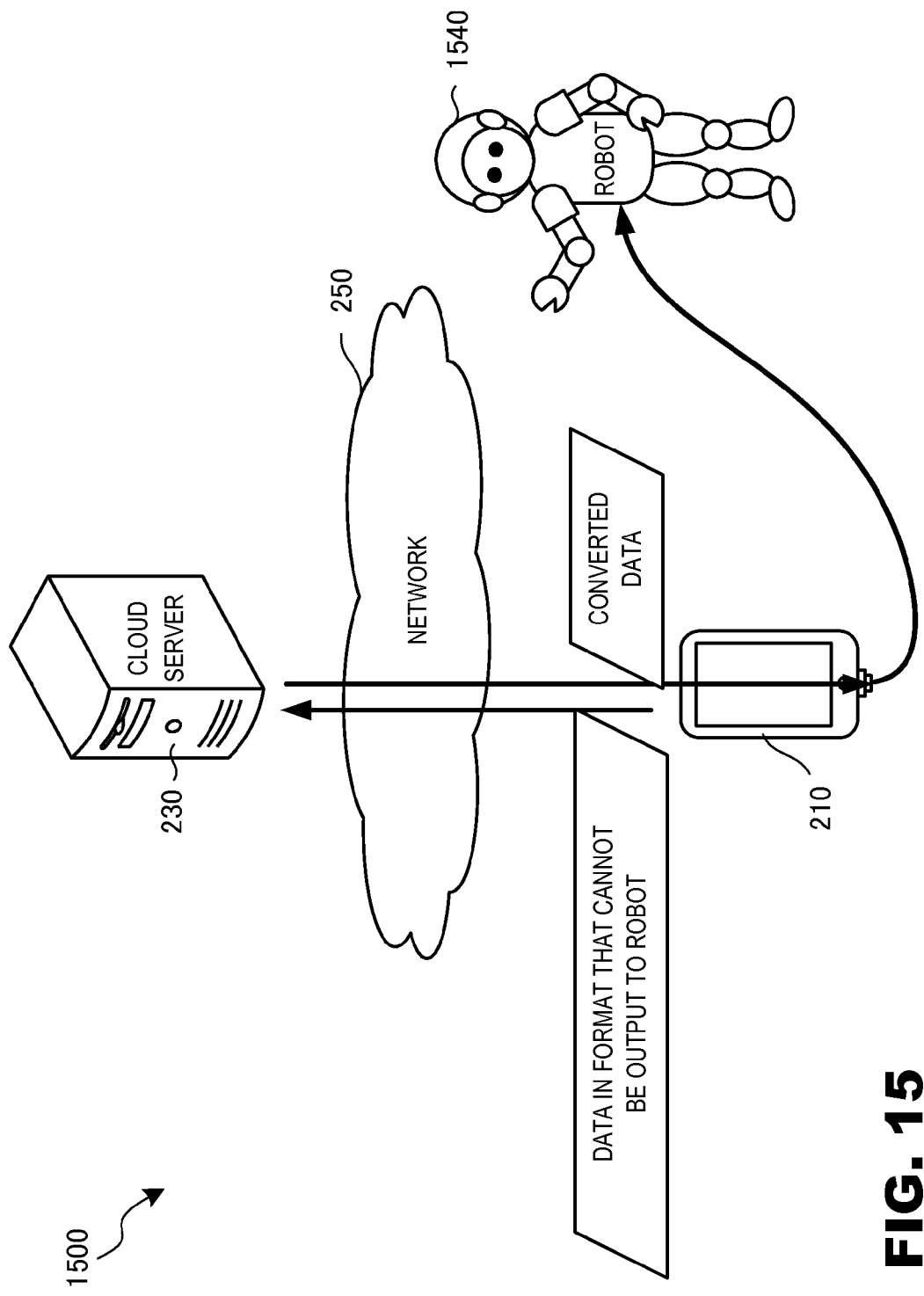

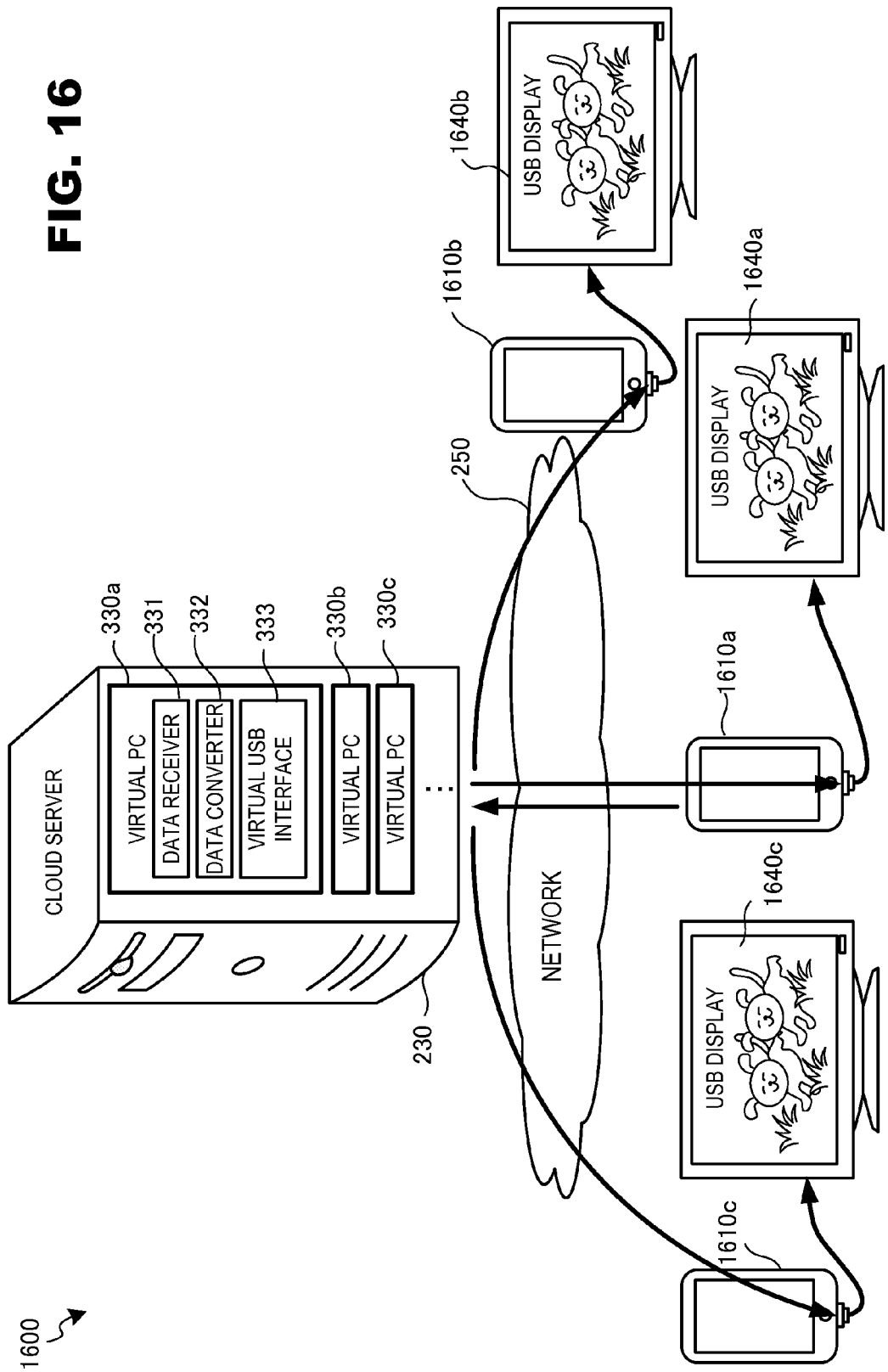

INFORMATION PROCESSING SYSTEM, INFORMATION PROCESSING METHOD, MOBILE PHONE, SERVER, AND CONTROL METHOD AND CONTROL PROGRAM THEREOF

CROSS-REFERENCE TO RELATED PATENT APPLICATIONS

This application is a National Stage Entry of International Application No. PCT/JP2013/053350, filed Feb 13, 2013, which claims priority from Japanese Patent Application No, 2012-046995, filed Mar 2, 2012. The entire contents of the above-referenced applications are expressly incorporated herein by reference.

TECHNICAL FIELD

The present invention relates to a technique for outputting data such as a content to an output device.

BACKGROUND ART

In the above-described technical field, patent literature 1 discloses a technique of displaying a content associated with a mobile phone used by a user on a display different from that of the mobile phone during speech communication.

CITATION LIST

Patent Literature

Patent literature 1: Japanese Patent Laid-Open No. 2011-223506

SUMMARY OF THE INVENTION

Technical Problem

In the technique described in patent literature 1, however, existence of two mobile phones is always necessary. In addition, this technique cannot be implemented when a peripheral device has no function of communicating with a content server. Furthermore, a content in a format that cannot be output to a peripheral device cannot be output from the peripheral device. That is, data in a format processable by an output device cannot be output to the output device only by connecting a mobile phone to the output device.

The present invention enables to provide a technique of solving the above-described problems.

Solution to Problems

One aspect of the present invention provides an information processing system comprising a mobile phone; and a server,
the mobile phone comprising:
a determiner that, when an output device is connected via a communication interface, recognizes the output device and determines whether the mobile phone can output data in a format processable by the output device;
a requester that, when the determiner determines that the mobile phone cannot output data processable by the output device, transmits a request to the server connected via a wireless communication network to supply data in the format processable by the output device;
a receiver that receives the data provided by the server; and
a transmitter that transmits the data received by the receiver to the output device via the communication interface, and
the server comprising:
a transmitter that transmits the data in the format processable by the output device to the mobile phone in response to the request from the requester of the mobile phone.

Another aspect of the present invention provides a mobile phone comprising:
a determiner that, when an output device is connected via a communication interface, determines whether the mobile phone can output data processable by the output device;
a requester that, when the determiner determines that the mobile phone cannot output data processable by the output device, transmits a request to a server connected via a wireless communication network to supply the data in a format processable by the output device;
a receiver that receives the data provided by the server; and
a transmitter that transmits the data received by the receiver to the output device via the communication interface.

Still other aspect of the present invention provides a method of controlling a mobile phone, the method comprising:
recognizing an output device, when the output device is connected via a communication interface, and determining whether the mobile phone can output data processable by the output device;
transmitting a request, when it is determined in the determining step that the mobile phone cannot output data processable by the output device, to a server connected via a wireless communication network to supply the data in a format processable by the output device;
receiving the data provided by the server; and
transmitting the data received in the receiving step to the output device via the communication interface.

Still other aspect of the present invention provides a control program of a mobile phone, the program causing a computer to execute a method, comprising:
recognizing, when an output device is connected via a communication interface, and determining whether the mobile phone can output data in a format processable by the output device;
transmitting a request, when it is determined in the determining step that the mobile phone cannot output data processable by the output device, to a server connected via a wireless communication network to supply the data in the format processable by the output device;
receiving the data provided by the server; and
transmitting the data received in the receiving step to the output device via the communication interface.

Still other aspect of the present invention provides a server included in the above-described information processing system, comprising:
a transmitter that transmits the data in the format processable by the output device to the mobile phone in response to the request from the requester of the mobile phone.

Still other aspect of the present invention provides a method of controlling a server included in the above-described information processing system, the method comprising:
transmitting the data in the format processable by the output device to the mobile phone in response to the request from the requester of the mobile phone.

Still other aspect of the present invention provides a control program of a server included in the above-described informa tion processing system, the program causing a computer to execute a method, comprising:

transmitting the data in the format processable by the output device to the mobile phone in response to the request from the requester of the mobile phone.

Still other aspect of the present invention provides an information processing method comprising:

recognizing an output device, when the output device is connected to a mobile phone via a communication interface, and determining whether the mobile phone can output data in a format processable by the output device, by the mobile phone;

transmitting a request, when it is determined in the determining step that the mobile phone cannot output data processable by the output device, to a server connected via a wireless communication network to supply the data in the format processable by the output device, by the mobile phone;

transmitting the data in the format processable by the output device to the mobile phone in response to the request, by the server;

receiving the data provided by the server, by the mobile phone; and transmitting the data received in the receiving step to the output device via the communication interface, by the mobile phone.

Advantageous Effects of Invention

According to the present invention, it is possible to easily output data in a format processable by an output device only by connecting a mobile phone to the output device.

BRIEF DESCRIPTION OF THE DRAWINGS

FIG. 7E is a view showing the table of an output device according to the second embodiment of the present invention;

FIG. 8 is a block diagram showing the hardware arrangement of the smartphone according to the second embodiment of the present invention;

FIG. 9B is a block diagram showing the arrangement of an information processing system according to the fourth embodiment of the present invention;

FIG. 15 is a flowchart showing processing of the procedure of an information processing system according to the eighth embodiment of the present invention; and FIG. 16 is a flowchart showing processing of the procedure of an information processing system according to the ninth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

Figure 1:
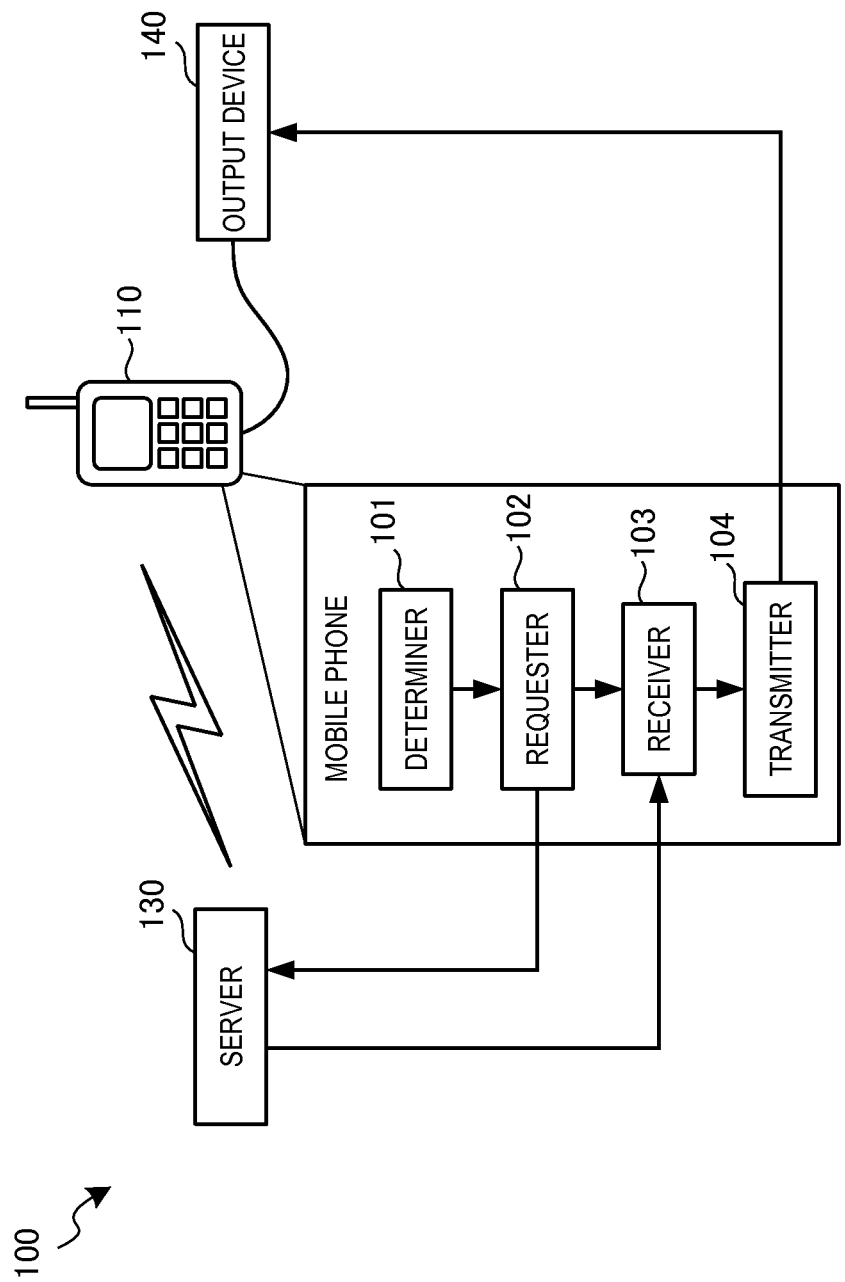
FIG. 1 is a block diagram showing the arrangement of an information processing system according to the first embodiment of the present invention.

An information processing apparatus 100 according to the first embodiment of the present invention will be described with reference to FIG. 1. The information processing system 100 is a system including a mobile phone 110 connected to an output device 140, and a server 130.

The mobile phone 110 includes a determiner 101, a requester 102, a receiver 103, and a transmitter 104. The determiner 101, when the output device 140 is connected via a communication interface, recognizes the output device 140 and determines whether the mobile phone can output data in a format processable by the output device 140. The requester 102, when the determiner 101 determines that the mobile phone cannot output data processable by the output device 140, transmits a request to the server 130 connected via a wireless communication network to supply data in a format processable by the output device 140.

The receiver 103 receives data supplied from the server 130. The transmitter 104 transmits the data received by the receiver 103 to the output device 140 via the communication interface.

The server 130 transmits data in the format processable by the output device 140 to the mobile phone 110 in response to the request from the requester 102.

According to this embodiment, with the above-described arrangement and operation, the server provides data to be output to the output device on behalf of the mobile phone. For this reason, it is possible to easily output data in the format processable by the output device only by connecting the mobile phone to the output device.

[Second Embodiment]

(Outline of Information Processing System)

Figure 2:
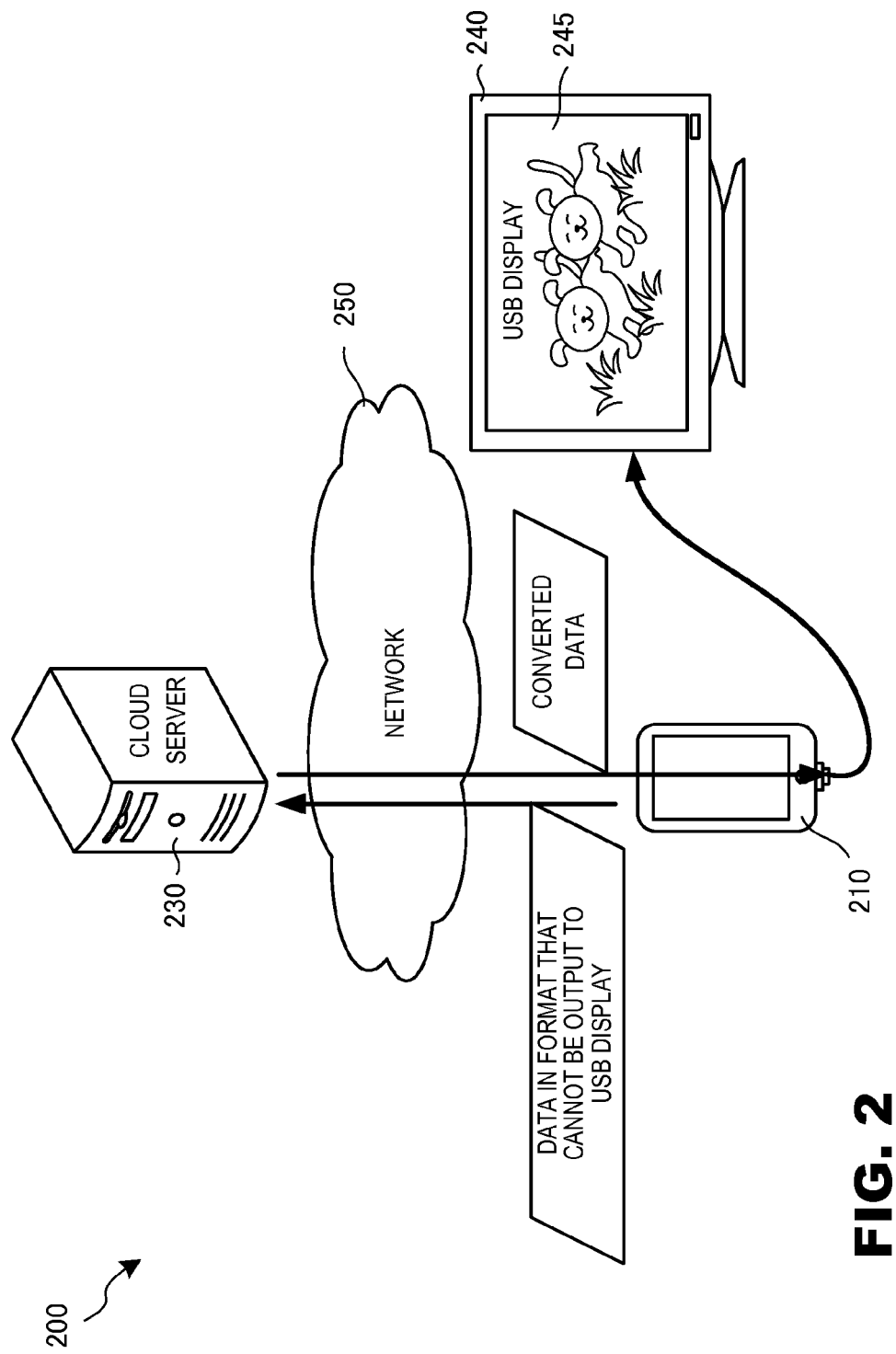
FIG. 2 is a block diagram showing the outline of an information processing system according to the second embodiment of the present invention.

An information processing system 200 according to the second embodiment of the present invention will be described next with reference to FIG. 2. FIG. 2 is a block diagram for explaining the outline of the information processing system 200 according to this embodiment.

The information processing system 200 includes a smartphone 210 serving as a mobile phone connectable to the Internet using a mobile communication network, and a cloud server 230. The smartphone 210 is connected so as to be able to communicate with the cloud server 230 via a network 250 of the mobile communication network. The smartphone 210 is connected so as to be able to communicate with a USB display 240 via a USB interface.

Note that in this embodiment, a system using a smartphone as an example of a mobile phone functioning as a relay device between the cloud server and an output device has been described. However, the present invention is not limited to this. As the mobile phone, any mobile communication terminal carried by a user in general is applicable. An example is a PHS (Personal Handy-phone System).

The smartphone 210 determines whether it can output held content data in a format displayable by the USB display 240. If the content data cannot be output in a data format displayable by the USB display 240, communication with the USB display 240 is disconnected, and the data format of the content is converted using the cloud server 230. The smartphone 210 receives the converted content data from the cloud server 230 and directly transmits it to the USB display 240 via the USB interface. The USB display 240 receives the received converted content data and displays it on a display screen 245.

Note that an example of a data format displayable by the USB display 240 is a data format of USB Video Class standard.

(Arrangement of Information Processing System)

Figure 3:
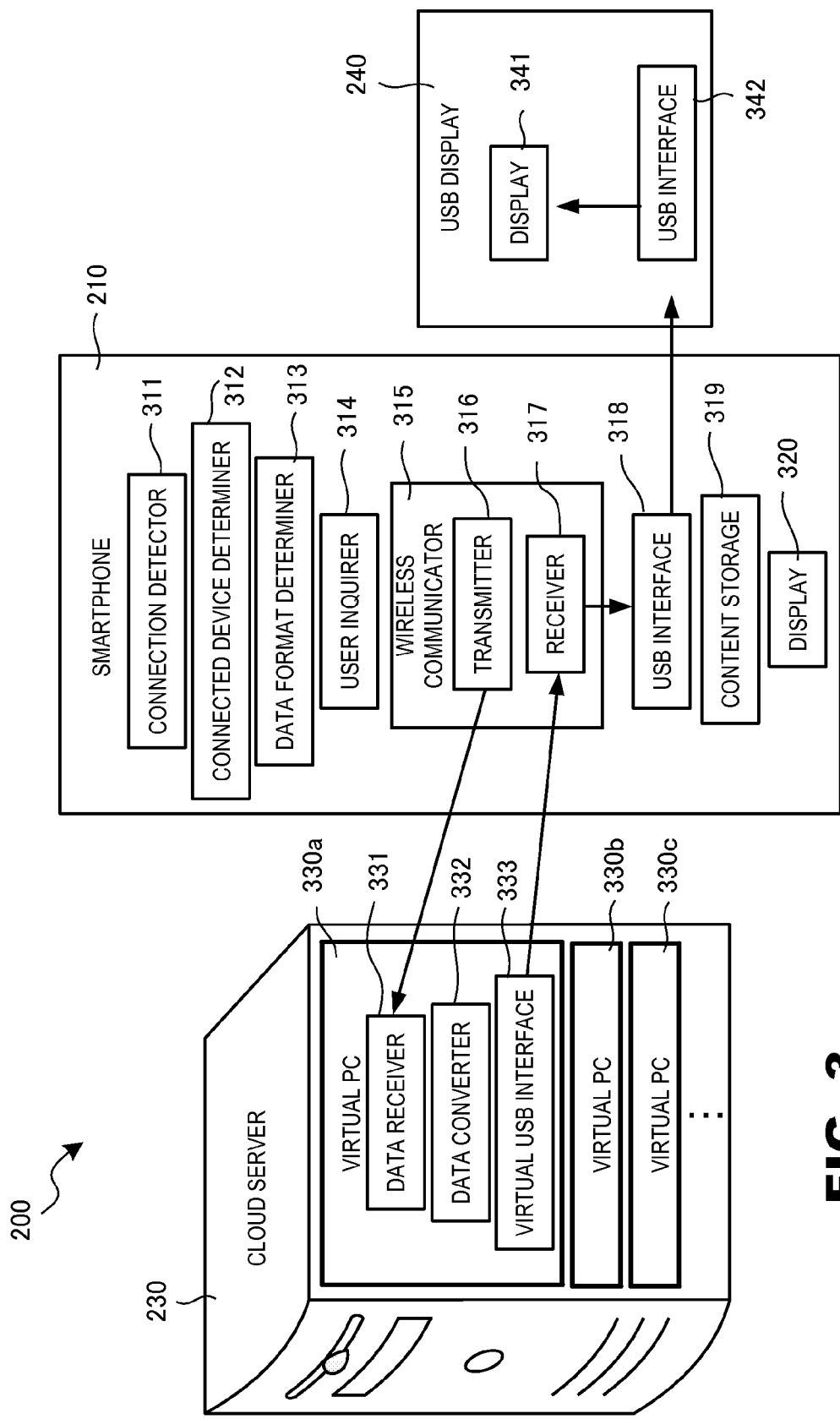
FIG. 3 is a block diagram showing the arrangement of the information processing system according to the second embodiment of the present invention.

The internal arrangement of the information processing system 200 will be described next with reference to FIG. 3. FIG. 3 is a block diagram showing the arrangement of the information processing system 200 according to this embodiment.

The smartphone 210 includes a connection detector 311, a connected device determiner 312, a data format determiner 313, a user inquirer 314, a wireless communicator 315, a USB interface 318, a content storage 319, and a display 320. The wireless communicator 315 includes a transmitter 316 and a receiver 317.

The cloud server 230 includes virtual PCs (Personal Computers) 330a to 330c. The virtual PC 330a includes a data receiver 331, a data converter 332, and a virtual USB interface 333. When the data format of a content needs to be converted, the smartphone 210 requests connection between the USB display 240 and the virtual USB interface 333 of the virtual PC 330a of the cloud server 230, and causes the cloud server 230 to convert the data format of the content. The USB display 240 includes a display 341 and a USB interface 342.

The connection detector 311 detects connection of an output device (USB display 240 here) via a USB interface serving as a communication interface. The connected device determiner 312 recognizes the USB display 240 connected via the USB interface 318, and determines whether the device can be processed (locally handled) by the smartphone. More specifically, the smartphone 210 detects that the output device whose connection is detected is the USB display 240, and its manufacturing source and product type, thereby determining whether the smartphone can output data processable by the USB display 240.

A USB device such as the USB display 240 and a host such as the smartphone 210 exchange USB transfer methods in the lowest physical layer, descriptors in USB logical processing, and plug-and-play protocols in the driver layer. Examples of USB transfer methods are control transfer, bulk transfer, interrupt transfer, and isochronous transfer. Matching of the physical communication mode is done between the device and the host by exchanging the methods.

On the other hand, the device and the host exchange device descriptors, configuration descriptors, interface descriptors, and endpoint descriptors as descriptors that are information for USB logical port control.

A device descriptor is information such as a vendor ID or product ID used to identify a device. A configuration descriptor is the USB configuration information of a target, and includes the number of interface descriptors. An interface descriptor is information of an interface, and includes the number of endpoint descriptors of the interface. An endpoint descriptor is information of an endpoint that is a port for communication.

When a terminal is connected to a USB port, the host requests descriptors of the connected device. The connected device responds to the request by a device descriptor and the like. The connected device determiner 312 thus grasps the profile of the USB display 240 connected via the USB interface 318, and determines whether the smartphone can provide data outputtable from the USB display 240.

Upon determining that there is no description of device class, subclass, and protocol, confirmation may be done by an interface descriptor instead of a device descriptor (see FIG. 7E). Alternatively, confirmation may be done by an environment variable $INTERFACE from the host side. Note that more information of a USB display is given by http://www.infinitegra.co.jp/technology/uvc_base1.htm. In addition, more information of descriptors of an interface and the like is given by http://monoist.atmarkit.co.jp/mn/articles/1007/20/news097.html.

The data format determiner 313 determines a data format processable by the USB display 240. The smartphone 210 thus determines whether content data stored in the content storage 319 is directly outputtable from the USB display 240. The user inquirer 314 inquires of the user which one of the USB display 240 and the display 320 incorporated in the smartphone 210 should be used as the output destination of the content data (see FIG. 6).

Note that in this embodiment, a case where the smartphone 210 includes the content storage 319 has been described. However, the cloud server 230 may include a content storage.

The wireless communicator 315 includes the transmitter 316 and the receiver 317. Upon receiving a content data format conversion instruction by a user operation, the transmitter 316 transmits, to the cloud server 230 via the network 250, a request to convert content data stored in the content storage 319 into data in a format processable by the USB display 240 and supply it.

The cloud server 230 includes the virtual PCs 330a to 330c on a user basis. If the user of the smartphone 210 is the registered owner of the virtual PC 330a, content data transmitted from the transmitter 316 after login is sent to the data receiver 331 of the virtual PC 330a. The data receiver 331 receives the content data transmitted from the smartphone 210. The data converter 332 converts the received content data into a data format outputtable by the USB display 240.

The virtual USB interface 333 transmits the converted content data (data in the USBoverIPnetwork format) to the receiver 317.

The receiver 317 extracts USB data from the received converted content data, and transfers it to the USB interface 318. The USB interface 318 transmits the received converted content data to the USB interface 342 of the USB display 240. The content storage 319 is a unit configured to store contents such as images and moving images in the smartphone 210. The display 320 is a display panel such as a liquid crystal display or organic EL display that displays a content. The display 320 may simultaneously have the functions of a touch panel.

In the USB display 240, the USB interface 342 extracts, on the display 341, the content data in the USB transfer format received from the USB interface 318. The display 341 displays the content data received by the USB interface 342.

(Procedure of Overall Processing)

Figure 4:
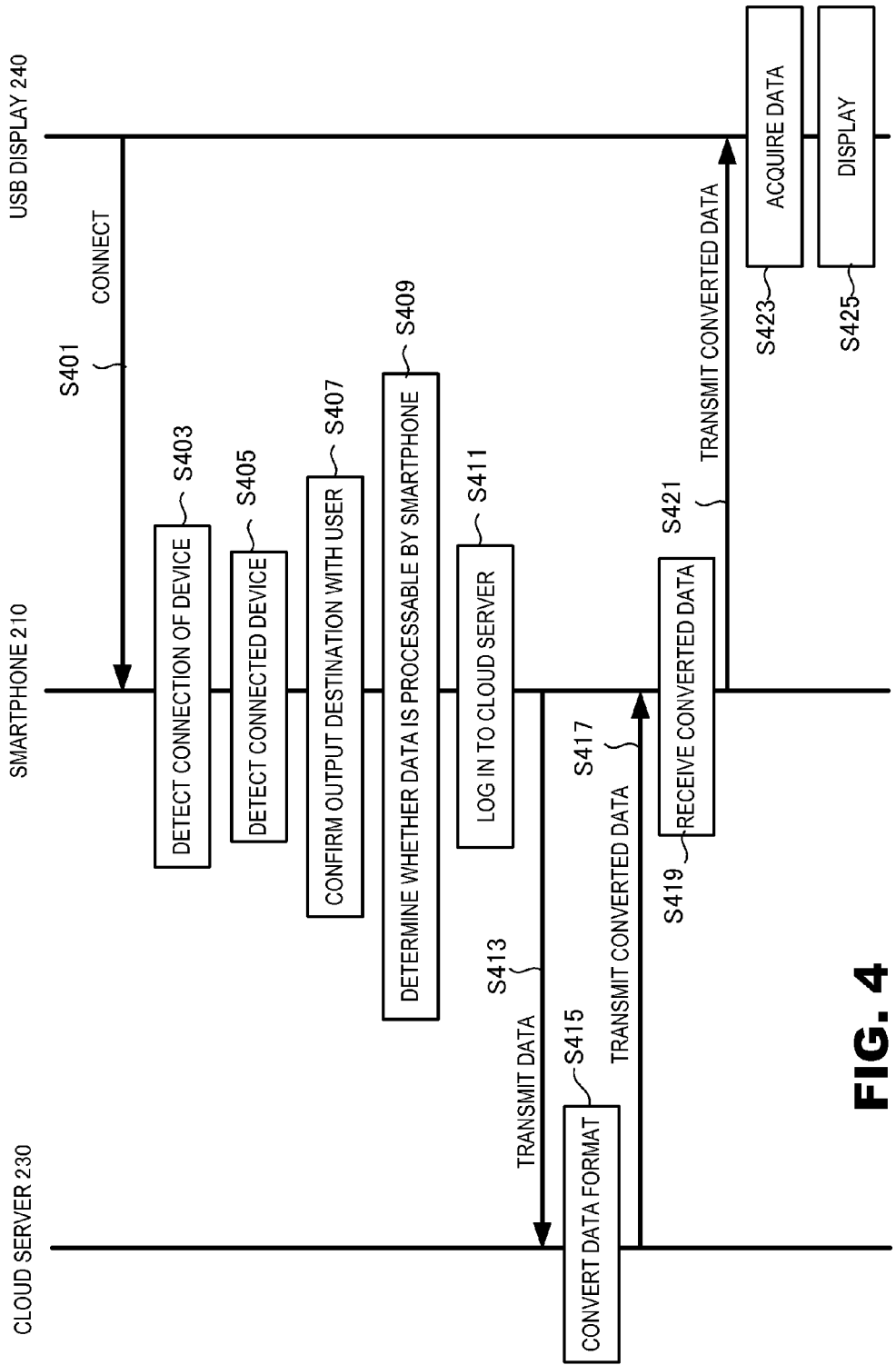
FIG. 4 is a sequence chart showing processing of the procedure of the information processing system according to the second embodiment of the present invention.

The procedure of processing of the information processing system 200 according to this embodiment will be described next with reference to FIG. 4. FIG. 4 is a sequence chart showing the procedure of overall processing of the information processing system 200 according to this embodiment.

When the USB display 240 is connected to the smartphone 210 in step S401, the connection detector 311 of the smartphone 210 detects connection of the output device in step S403. In step S405, the connected device determiner 312 detects that the connected output device is the USB display 240. In step S407, the user inquirer 314 confirms with the user which one of the USB display 240 and the display 320 incorporated in the smartphone 210 should be selected as the output destination of content data stored in the content storage 319 (see FIG. 6).

When instructed to output the content data to the USB display 240, in step S409, the data format determiner 313 refers to the processing capability of the smartphone 210, and determines whether it can convert the content data stored in the content storage 319 into a data format acceptable by the USB display 240. Note that when instructed to display the content data on the display 320, the data format determiner 313 may determine whether the smartphone can display the content.

Upon determining that the smartphone cannot convert the content data into a data format for the USB display 240, the smartphone 210 logs in to the cloud server 230 in step S411. In step S413, the transmitter 316 transmits the content data stored in the content storage 319 to the cloud server 230.

In step S415, the virtual PC 330a generates screen data based on the content data, and converts the screen data into USB data displayable by the USB display 240. In step S417, the virtual USB interface 333 encapsulates the USB data in an IP frame and sends it to the smartphone 210.

In step S419, the receiver 317 of the wireless communicator 315 receives the converted content data and deletes the IP frame of the receive data. In step S421, the USB data as the content is transmitted to the USB display 240 via the USB port.

In step S423, the USB interface 342 acquires the content data transmitted from the smartphone 210. In step S425, the display 341 outputs the acquired content data. After that, when the smartphone 210 and the USB display 240 are disconnected (the USB interface is removed), the smartphone 210 and the cloud server 230 are also automatically disconnected.

(Processing Performed by Smartphone)

Figure 5A:
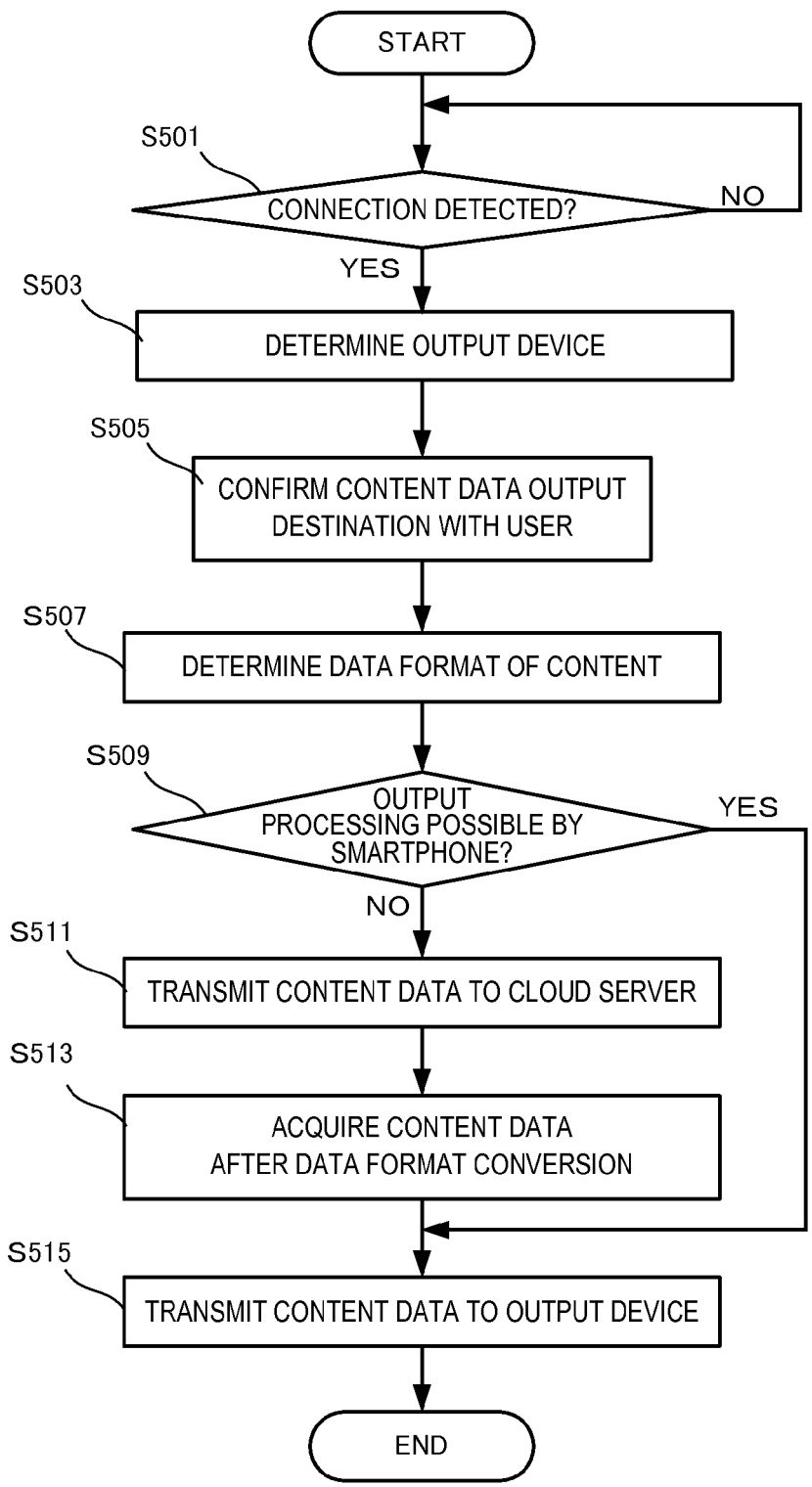
FIG. 5A is a flowchart showing processing of the procedure of a smartphone according to the second embodiment of the present invention.

FIG. 5A is a flowchart showing the procedure of processing of the smartphone 210 according to this embodiment.

In step S501, the connection detector 311 detects whether an output device is connected. Upon detecting an output device, the process advances to step S503. In step S503, the connected device determiner 312 determines that the connected output device is the USB display 240. In step S505, the user inquirer 314 displays, on the display 320, a message to confirm with the user which one of the display 320 of the smartphone and the USB display 240 should be used as the output destination of content data (see a message 601 in FIG. 6). In step S507, the data format determiner 313 determines whether the content data stored in the content storage 319 can directly be output to the USB display 240. Additionally, the data format determiner 313 determines in step S509 whether the smartphone can perform necessary conversion processing. Upon determining that the smartphone can perform the processing, the process advances to step S515 to directly transmit the content data to the USB display 240 as the output device.

On the other hand, upon determining that the data format cannot be processed by the smartphone, in step S511, the transmitter 316 transmits the content data to the cloud server 230 to which the smartphone has logged in. In step S513, the receiver 317 acquires the content data whose data format has been converted by the virtual PC 330a of the cloud server 230. Finally, in step S515, the USB interface 318 transmits the content data to the USB display 240.

(Processing Performed by Cloud Server)

Figure 5B:
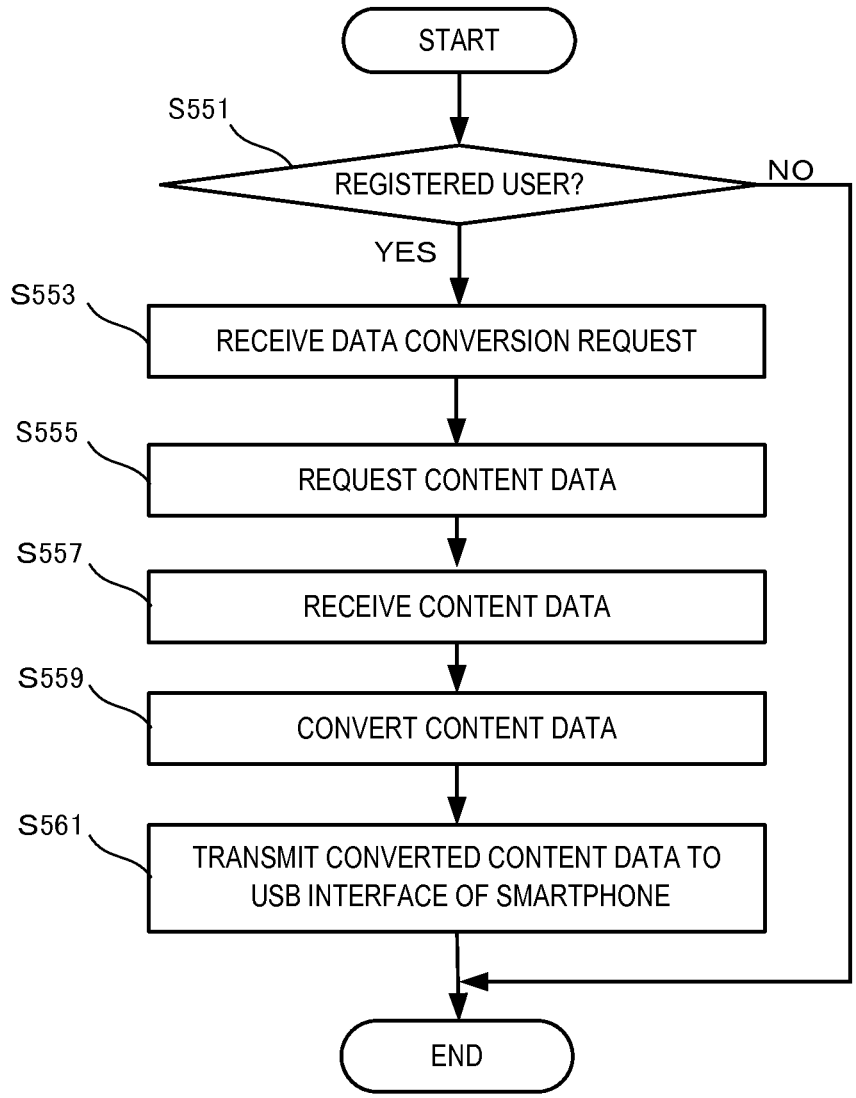
FIG. 5B is a flowchart showing processing of the procedure of a cloud server according to the second embodiment of the present invention.

FIG. 5B is a flowchart showing processing of the procedure of the cloud server according to this embodiment.

In step S551, the virtual PC 330a confirms whether the smartphone 210 that requests login is a user registered in the cloud server 230. In step S553, the data receiver 331 receives a data format conversion request from the smartphone 210. In step S555, the data receiver 331 requests content data of the smartphone 210.

In step S557, the data receiver 331 receives the content data transmitted from the smartphone 210. In step S559, the data converter 332 converts the received content data into a data format outputtable by the USB display 240. In step S561, the virtual USB interface 333 transmits the converted content data to the USB interface 318 of the smartphone 210.

(Output Device Recognition Processing)

Figure 7A:
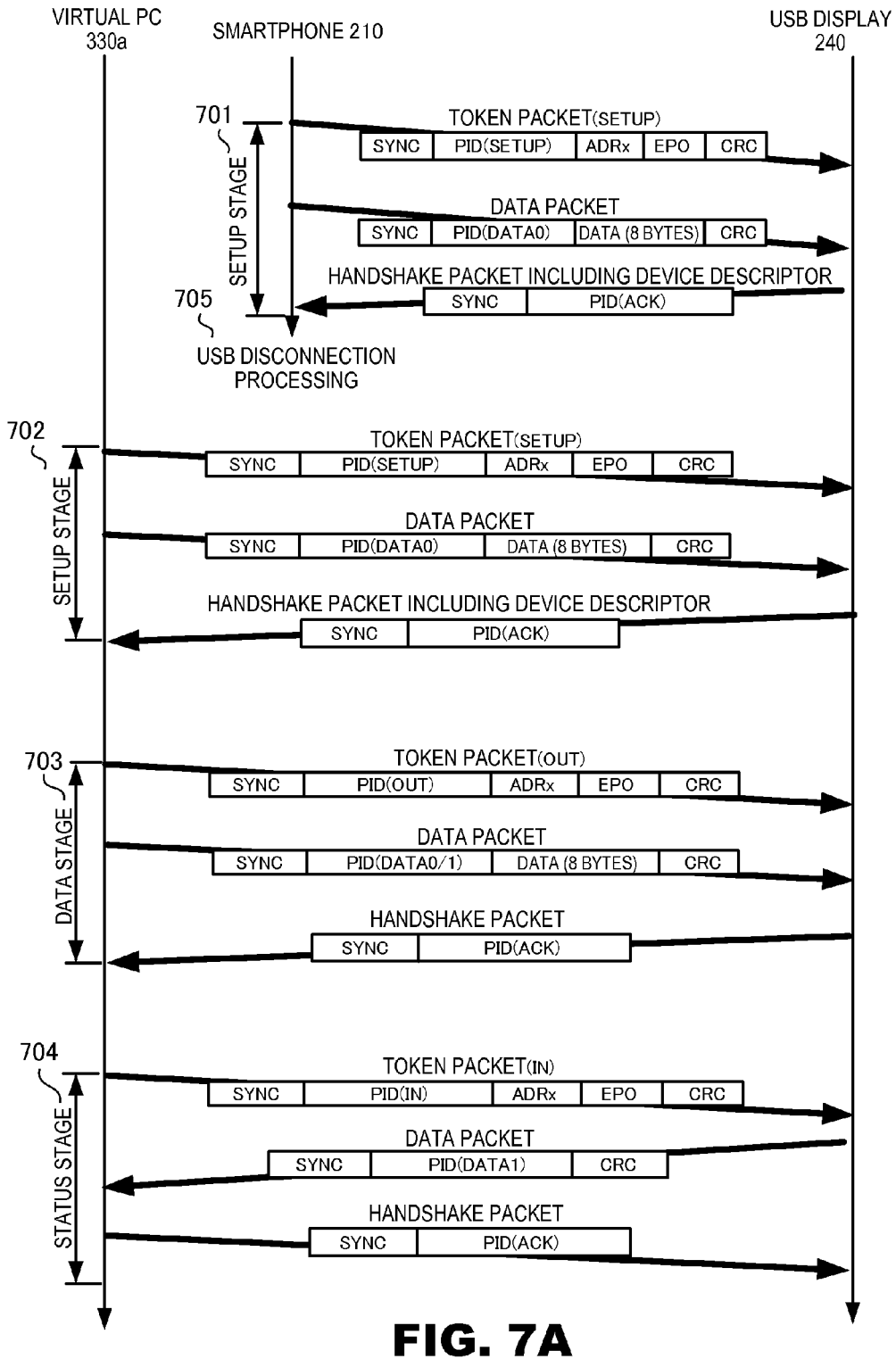
FIG. 7A is a view for explaining packet data exchange according to the second embodiment of the present invention.

FIG. 7A is a view for explaining packet data to be exchanged between the virtual PC 330a, the smartphone 210, and the USB display 240. When the smartphone 210 and the USB display 240 are connected, they exchange a token packet, a data packet, and a handshake packet including a device descriptor in a setup stage 701. The smartphone 210 reads out the value of the device descriptor in the handshake packet that is sent as a return to the token packet out of the packets, thereby recognizing the USB display 240 as an output device. The smartphone 210 then determines whether the smartphone can prepare the content data to be output to the USB display 240.

Figure 7B:
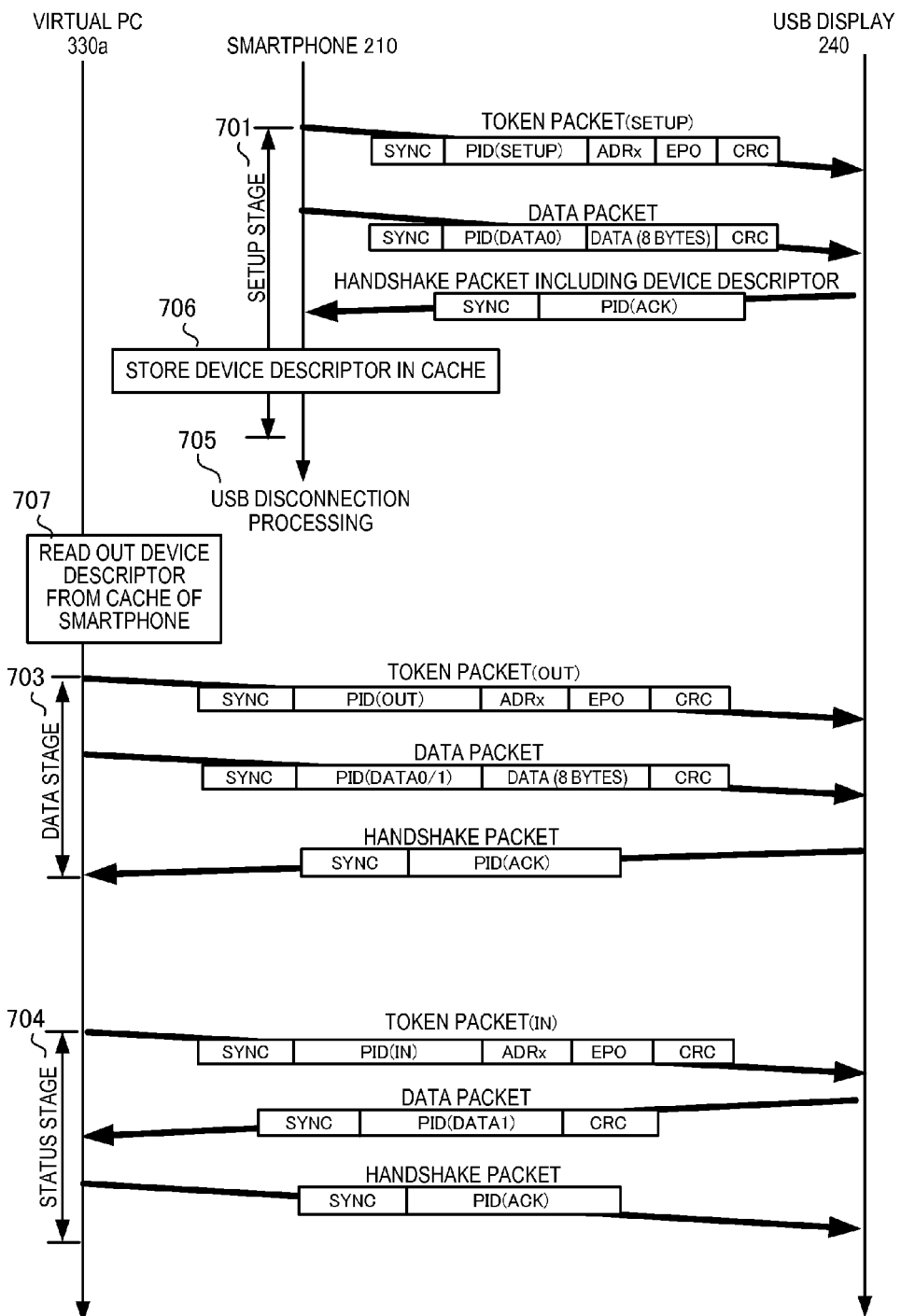
FIG. 7B is a view for explaining packet data exchange according to the second embodiment of the present invention.

Alternatively, as shown in FIG. 7B, the device descriptor acquired by the setup operation between the smartphone 210 and the USB display 240 may be cached in the smartphone 210 (706). In this case, when the smartphone 210 and the USB display 240 are temporarily disconnected, and the processing is resumed, the virtual PC 330a can read out the device descriptor from the cache of the smartphone 210 (707) and perform processing of a data stage 703. That is, since processing of a setup stage 702 to be performed between the virtual PC 330a and the USB display 240 can be omitted, resumption after disconnection of communication with the USB display 240 can efficiently be performed.

The smartphone 210 may determine whether processing is possible by causing the OS (Operating System) of the smartphone to compare the connected output device with the table of output devices that cannot be processed (or can be processed) by the smartphone.

Upon determining that the smartphone cannot perform the processing, USB disconnection processing 705 is performed, and connection processing between the USB display 240 and the virtual PC 330a of the cloud server 230 is performed newly (702 to 704). The virtual PC 330a includes many drivers and data conversion modules in advance so as to be connectable with any USB device existing in the world. Hence, the setup stage 702, the data stage 703, and the status stage 704 are smoothly performed between the virtual PC 330a and the USB display 240, and connection with the USB display 240 is adequately established.

Figure 7C:
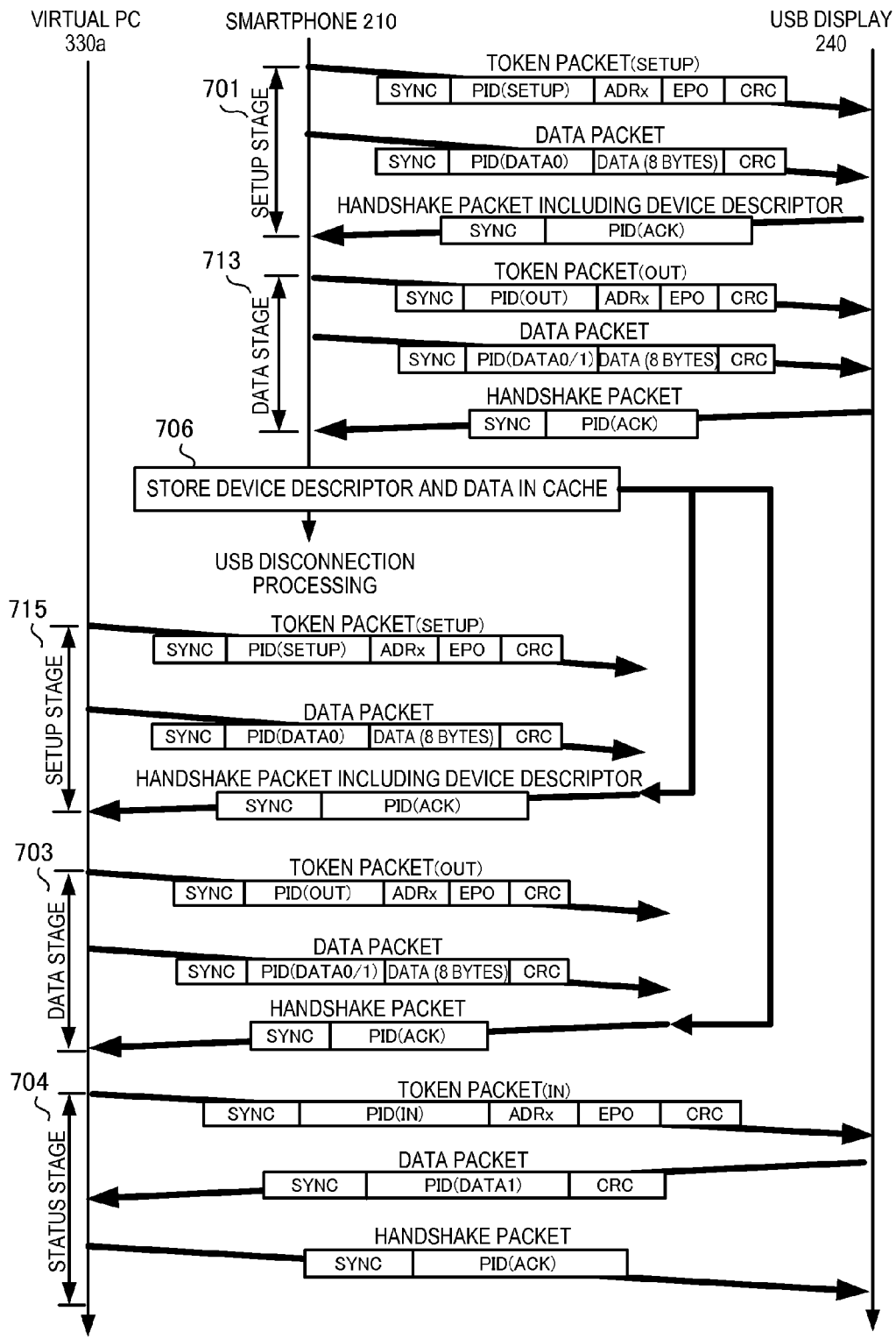
FIG. 7C is a view for explaining packet data exchange according to the second embodiment of the present invention.

Alternatively, as shown in FIG. 7C, the device descriptor acquired by the setup operation between the smartphone 210 and the USB display 240 and a handshake packet (data) acquired from the USB display 240 in a subsequent data stage 713 may be cached in the smartphone 210 (706).

After that, the smartphone 210 and the USB display 240 are temporarily disconnected. The virtual PC 330a then takes initiative in starting connection establishment processing for the USB display 240. In this case, in a setup stage 715, the smartphone 210 transmits the device descriptor from its cache to the virtual PC 330a as a handshake packet without sending a token packet and a data packet for setup to the USB display 240. In the data stage 703 as well, upon receiving a token packet and a data packet from the virtual PC 330a, the smartphone 210 reads out data from the cache and transmits it to the virtual PC 330a as a handshake packet instead of sending the received packets to the USB display 240. That is, since processing of the setup stage and the like to be performed between the virtual PC 330a and the USB display 240 can be omitted, resumption after disconnection of communication with the USB display 240 can efficiently be performed.

(Data Conversion Table)

Figure 7D:
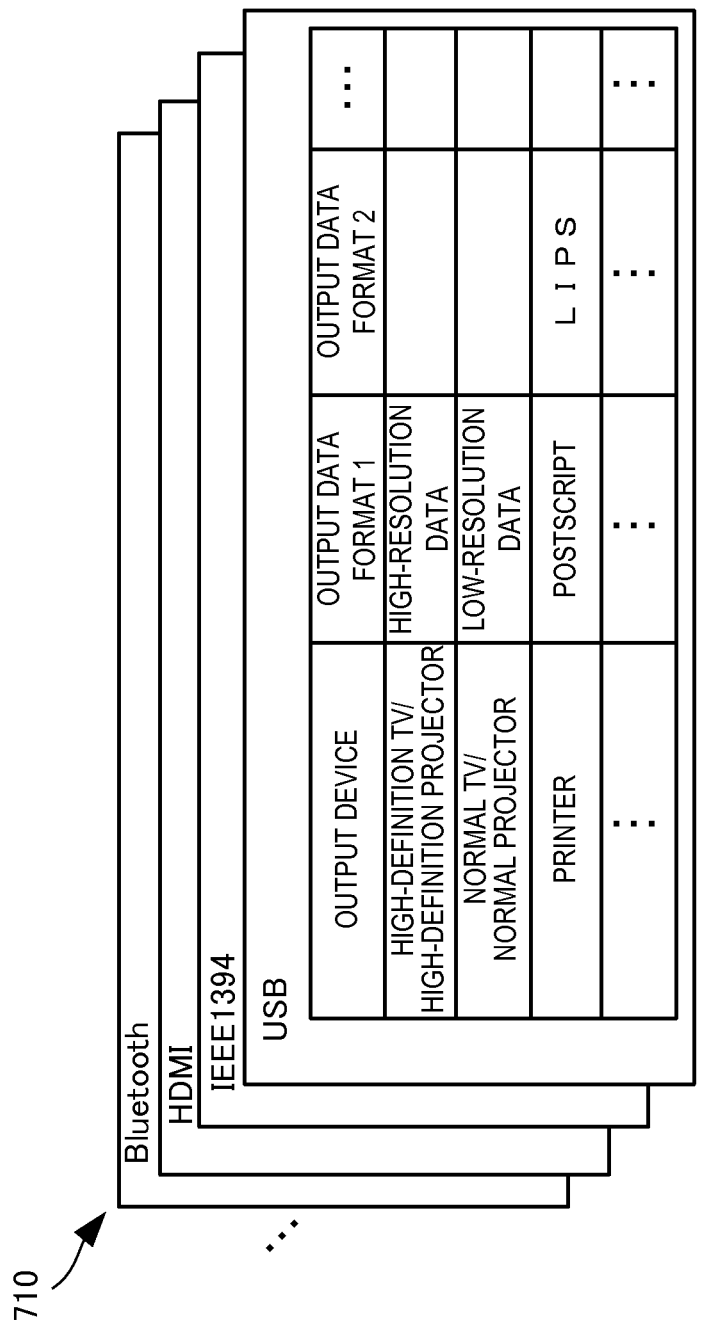
FIG. 7D is a view showing a content data conversion table according to the second embodiment of the present invention.

FIG. 7D is a view showing the contents of a data conversion table 710 held by the data converter 332. As shown in FIG. 7D, the data conversion table 710 stores an output device type and the data format of a content to be converted in association with each other for each communication interface between the smartphone 210 and an output device. Data is converted into an output format according to the virtual USB interface 333 and the output device using the data conversion table 710.

(Output Device Specifying Table)

As shown in FIG. 7E, the smartphone 210 stores a table 730 representing the correspondence relationship between a device descriptor 731 having a device driver, an interface descriptor 732, a vender ID 733, and a product ID 734.

When connected to the USB display 240, the smartphone 210 compares the device descriptor notified by the USB display 240 with the device descriptor 731 on the table 730. If the device descriptor notified by the USB display 240 matches the device descriptor on the table 730, the smartphone 210 determines that the USB display 240 is an output device processable by the smartphone. On the other hand, if the device descriptors do not match, the smartphone 210 determines that the USB display 240 is an output device that cannot be processed by the smartphone.

Note that the vendor ID and the product ID in the device descriptor notified by the USB display 240 may be extracted and compared with the vender ID 733 and the product ID 734 in the table 730. In this case, if the matching vender ID 733 and the product ID 734 which match the extracted IDs exist in the table 730, the smartphone can determine that the output device is processable by the smartphone. Inversely, if the vender ID 733 and the product ID 734 do not match the extracted IDs, the smartphone 210 can determine that the USB display 240 cannot be processed by the smartphone.

When data to be output is an image, the smartphone 210 can determine that the output device cannot be processed by the smartphone if a resolution processable by the output device is not included in resolutions predetermined as processable by the smartphone.

(Hardware Arrangement of Smartphone)

The internal arrangement of the smartphone 210 will be described with reference to FIG. 8. The smartphone 210 includes a CPU 810, a ROM 820, a communication controller 830, a RAM 840, and a storage 850. The CPU 810 is a central processor and controls the entire smartphone 210 by executing various programs. The ROM 820 is a read only memory and stores various kinds of parameters in addition to a boot program to be executed by the CPU 810 first. The RAM 840 stores a connection detection result 841, a connected device detection result 842, a data format determination result 843, acquired content data 844, and converted content data 845.

Figure 6:
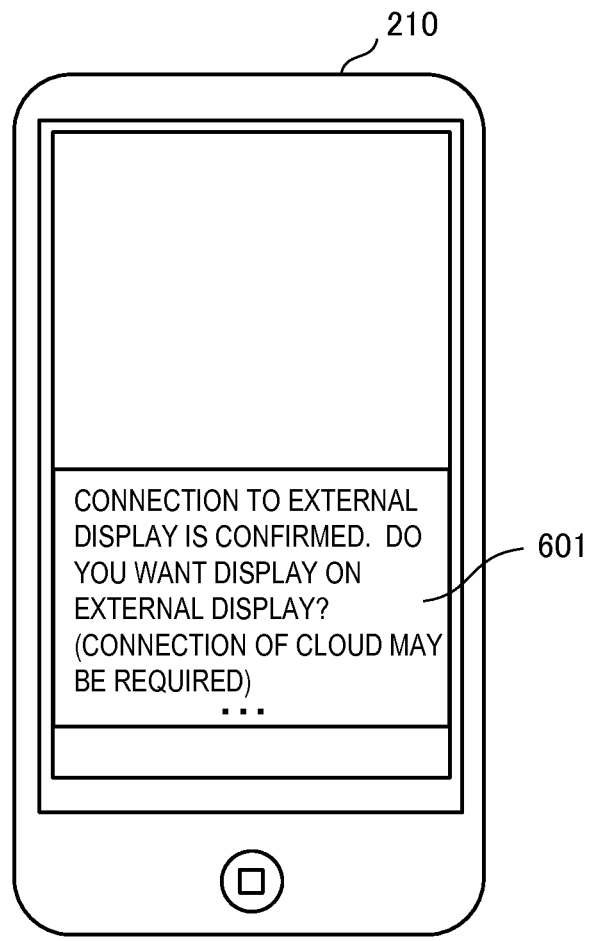
FIG. 6 is a view showing the display of the smartphone according to the second embodiment of the present invention.

The storage 850 stores a database 851 representing the processing capability of the smartphone. The storage 850 also stores a device determination module 853, a content request module 854, a content relay module 855, and a user interface display module 856. The device determination module 853 is executed by the CPU 810 so as to function as a determiner that determines, for a device connected via a communication interface such as a USB interface, whether connection and processing are possible. The content request module 854 is executed by the CPU 810 so as to function as a requester that requests the cloud server 230 connected via a wireless communication network to supply a content in a data format acceptable by an output device when the output device is determined not to be a device processable by the smartphone. The content relay module 855 is executed by the CPU 810 so as to function as a transmitter that relays a content received from the cloud server 230 and transmits it to the output device. The user interface display module 856 is executed by the CPU 810 so as to display a dialogue as shown in FIG. 6 on the display of the smartphone 210.

An input/output interface 860 relays input/output data with respect to an input/output device. The display 320, a touch panel 862, a speaker 864, a microphone 865, and a camera 866 are connected to the input/output interface 860.

The communication controller 830 controls communication with the cloud server 230 via a network, and controls communication with an output device and/or an input device.

The connection detection result 841 is a primarily stored connection detection result of a connected device detected by the connection detector 311. The connected device determination result 842 is a primarily stored result of determining the type of the detected connected device. In this embodiment, the USB display 240 is primarily stored. The data format determination result 843 is a primarily stored result of determining whether content data acquired by the smartphone has a data format outputtable by the USB display 240 when it is transferred to the USB display 240.

The acquired content data 844 is primarily stored acquired content data. The converted content data 845 is primarily stored content data that is obtained by converting acquired content data by the cloud server 230 for transmission to the USB display 240.

(Use Example of Speech Communication Function of Smartphone)

Note that a service may be provided from the cloud server 230 using the speech communication function of the smartphone 210. For example, when connected to an output device, the smartphone 210 determines whether the output device normally operates, and transmits the determination result to the cloud server 230. If the output device does not normally operate, the cloud server 230 acquires the ID of the output device, operation history, and environment data such as a use frequency, use length, use state, and installation environment, and detects and specifies a failure portion. When the failure portion of the output device is specified, the cloud server 230 notifies the maker of it. Based on this notification, the service center of the maker originates a direct call to the smartphone 210. The user who has received the call from the service center can be advised by an operator to make the output device normally operate. Upon detecting connection of the smartphone to the output device by the user, the cloud server 230 acquires information of the user from the ID of the smartphone, and instructs the service center to dispatch a service person or the like of the maker of the output device or deliver the part of the output device to the user's home. The cloud server 230 may directly access the output device and upgrade the firmware of the output device to cope with the operation error such as a failure.

The virtual PC 330*a* may acquire information of a keyboard or pointer device (for example, mouse) connected to the smartphone 210 and execute character input or pointer control. The user thus performs operations in Internet surfing, microblogging, SNS (Social Networking Service), and the like from the smartphone via the virtual PC.

As described above, in this embodiment, content data is stored in the smartphone 210. However, the present invention is not limited to this. For example, the smartphone 210 may designate a URL where content data exists for the cloud server 230, and the cloud server 230 may download the content data from the URL and convert the data format of the content data. Alternatively, the cloud server 230 itself may hold content data and provide it to the smartphone 210.

In this embodiment, a USB display has been explained as an output device. However, the present invention is not limited to this. For example, a content in the smartphone may be displayed on an existing TV using HDMI (High-Definition Multimedia Interface), RGB (Red-Green-Blue color model), or the like in place of a USB interface.

With the above-described arrangement and operation, according to this embodiment, the cloud server 230 provides content data to be output to an output device via the smartphone 210. It is therefore possible to output data in a format processable by the output device only by connecting the smartphone 210 to the output device.

More specifically, the user can utilize a TV in or away from home as a network TV using the smartphone. Additionally, in a friend's home or the like, the user can view an online rental content or enjoy browsing SNS using a general-purpose TV via the smartphone.

In a business scene, the user can implement presentation in full high definition, meeting on a multiscreen, or cooperation environment using a TV or monitor installed away from office if he/she has the smartphone. This obviates the necessity of carrying a heavy hi-spec personal computer, file, and the like.

[Third Embodiment]

Figure 9A:
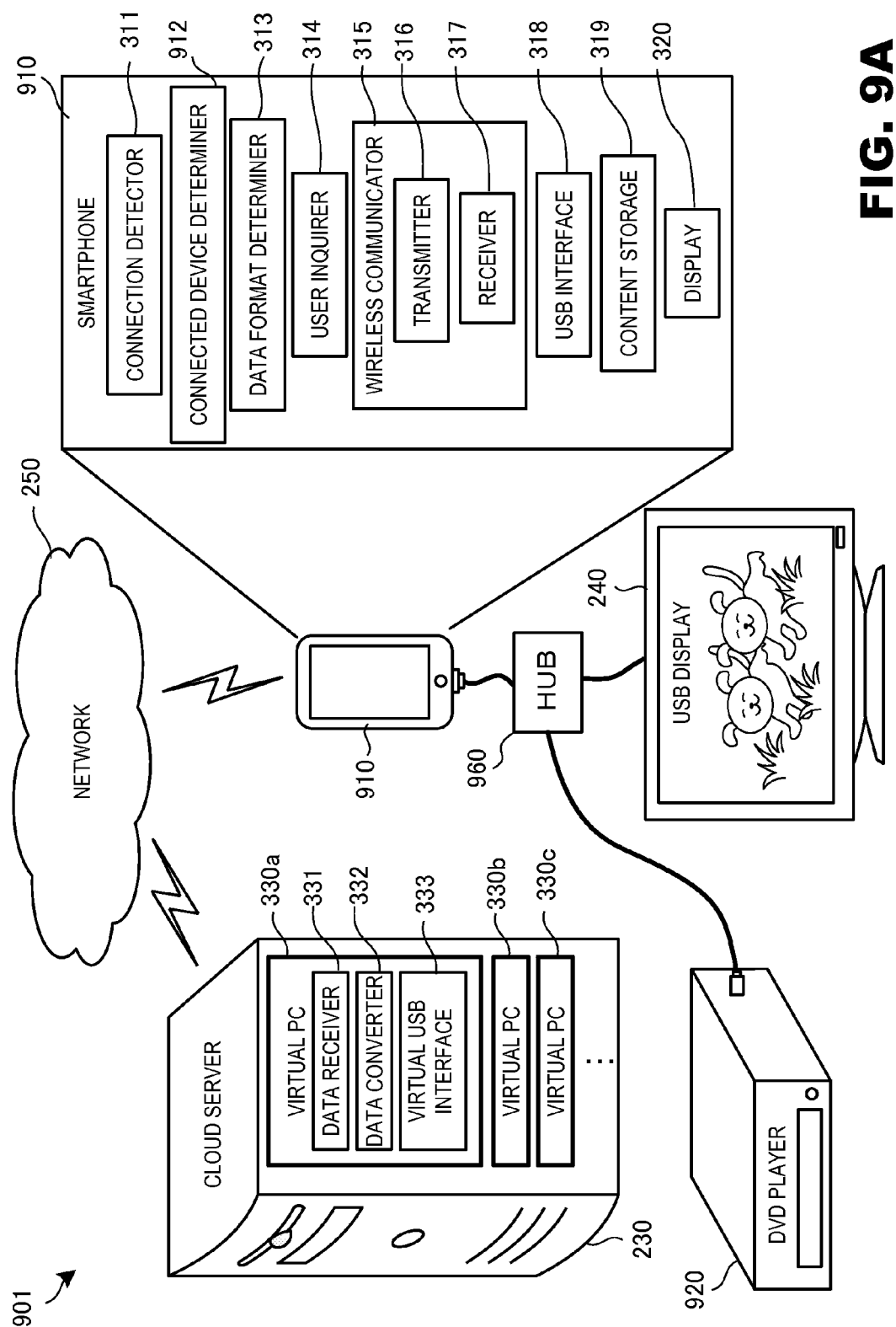
FIG. 9A is a block diagram showing the arrangement of an information processing system according to the third embodiment of the present invention.
Figure 10:
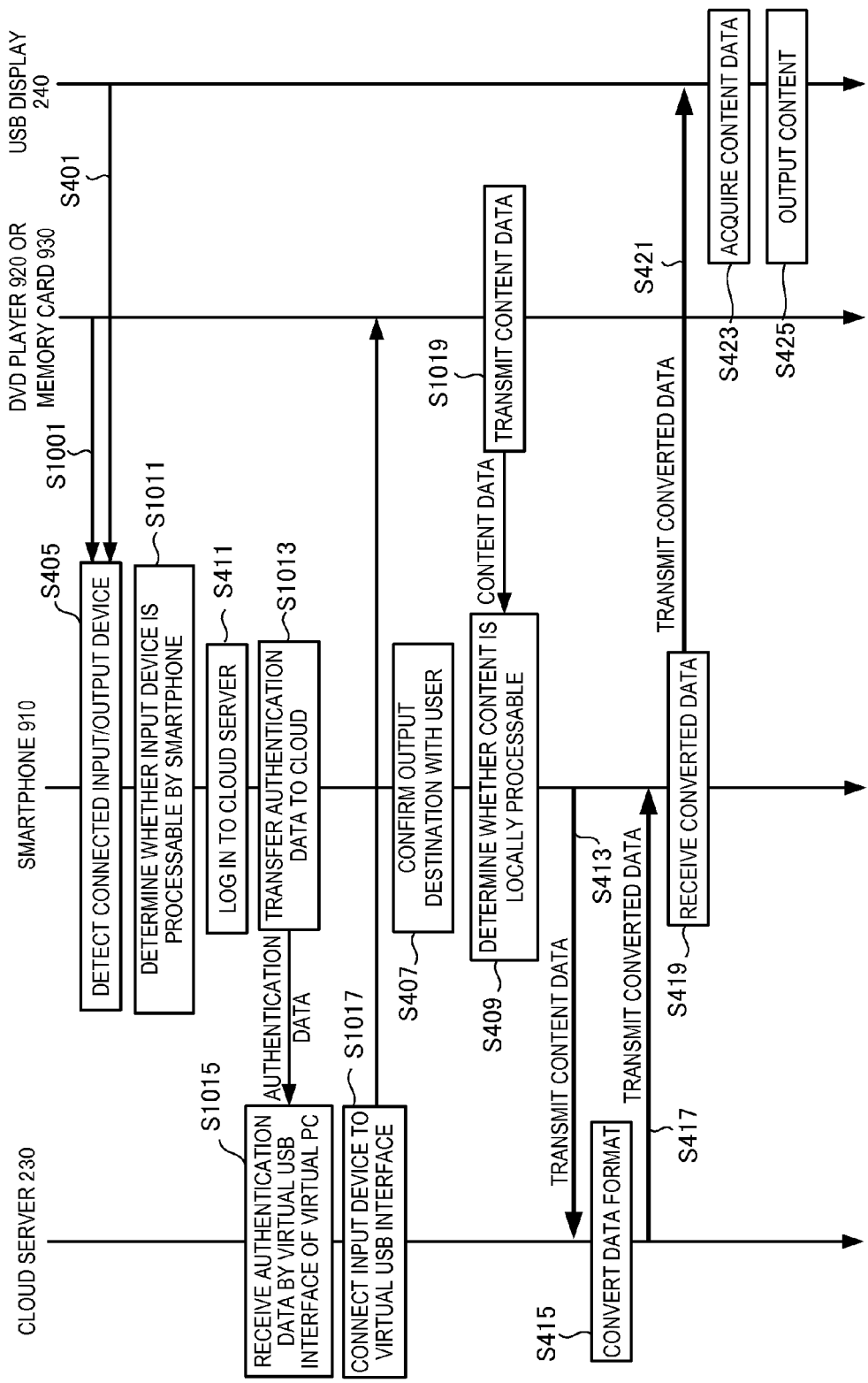
FIG. 10 is a sequence chart showing processing of the procedure of the information processing systems according to the third and fourth embodiments of the present invention.

An information processing system 901 according to the third embodiment of the present invention will be described next with reference to FIGS. 9A, 10, and 11. FIG. 9A is a block diagram for explaining the arrangement of the information processing system 901 according to this embodiment. The information processing system 901 according to this embodiment is different from the second embodiment in that a DVD player 920 is connected via a hub 960 as an input device. The rest of the components and operations is the same as in the second embodiment. The same reference numerals as in the second embodiment denote the same components and operations, and a detailed description thereof will be omitted.

According to this embodiment, even when the output device is a USB display 240 incapable of directly displaying a video signal from the DVD player 920, a DVD content can very easily be generated by causing the user to connect his/her smartphone 910.

The smartphone 910 shown in FIG. 9A is connected so as to be able to communicate with both the DVD player 920 and the USB display 240 via the hub 960. The smartphone 910 is also connected so as to be able to communicate with a cloud server 230 via a network 250.

A connection detector 311 of the smartphone 910 detects that the DVD player 920 serving as an input device and the USB display 240 serving as an output device are connected via the hub 960. A connected device determiner 912 determines that the connected input device is the DVD player 920, and the connected output device is the USB display 1140. A data format determiner 313 determines the data format of moving image content data input from the DVD player 920.

(Procedure of Overall Processing)

The procedure of processing of the information processing system 901 will be described with reference to FIG. 10. FIG. 10 is a sequence chart showing processing of the procedure of the information processing system 901 according to this embodiment. Note that a description of the same procedure processes as in the sequence chart (FIG. 4) showing the procedure processing of the information processing system 200 according to the second embodiment will be omitted.

In step S1001, the DVD player 920 is connected to the smartphone 910 via the hub 960.

In step S1011, a connected device determiner 912 determines whether the DVD player 920 serving as an input device detected by the connection detector 311 is an input device connectable by the smartphone. Upon determining that the DVD player is an input device unconnectable by the smartphone, the smartphone 910 logs in to the cloud server 230 in step S411.

In step S1013, a transmitter 316 transfers authentication data received from the DVD player 920 to the cloud server 230. Examples of the authentication data are descriptor information, interface descriptor information, handshake packet, token packet, and information of a setup stage, data stage, and status stage.

In step S1015, the cloud server 230 receives the authentication data by a virtual USB interface 333 of a virtual PC 330*a*. In step S1017, the virtual PC 330*a* performs processing of connecting the DVD player 920 to the virtual USB interface 333. In step S1019, the successfully connected DVD player 920 transmits content data to the smartphone 910.

(Flowchart of Smartphone)

Figure 11:
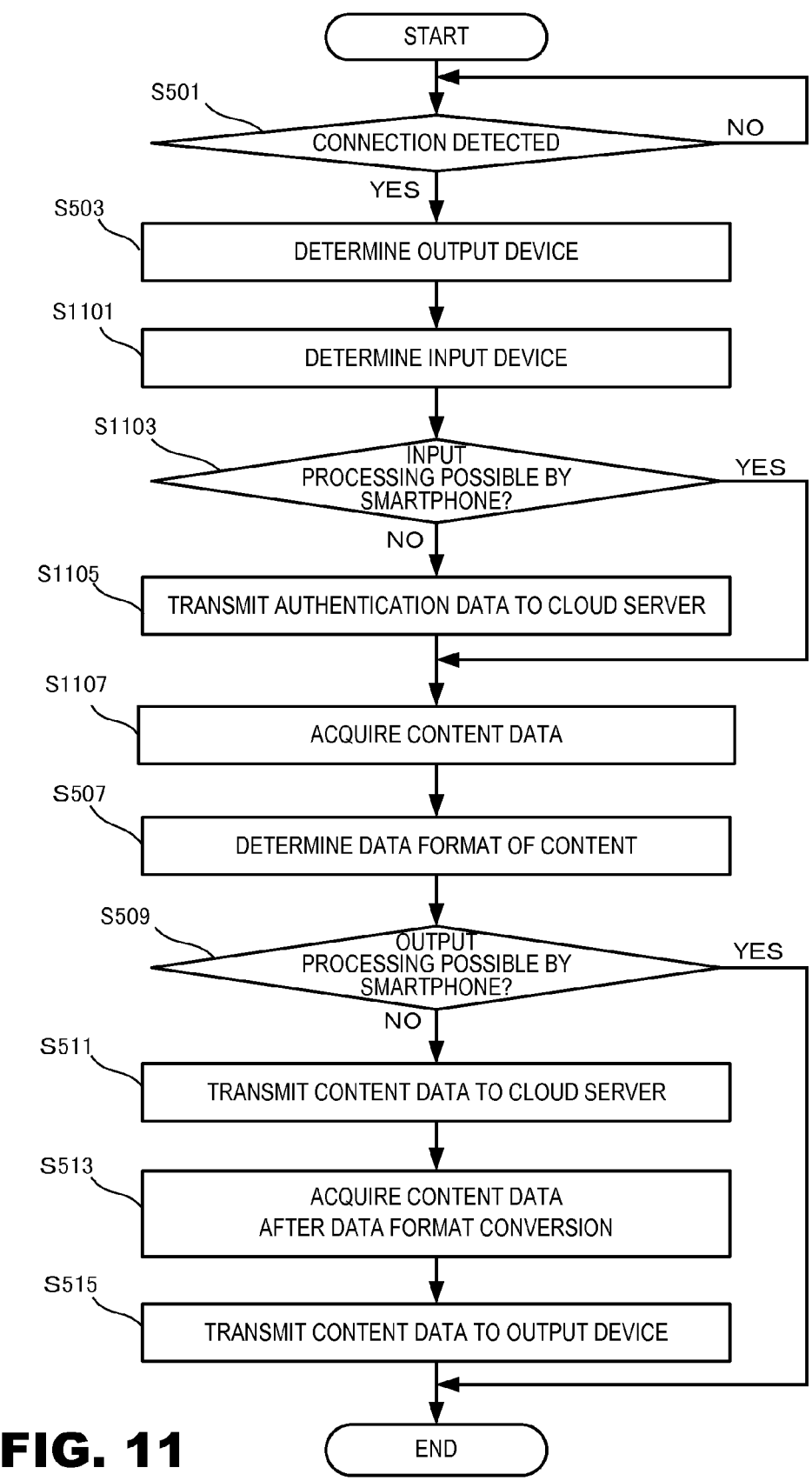
FIG. 11 is a flowchart showing processing of the procedure of smartphones according to the third and fourth embodiments of the present invention.

FIG. 11 is a flowchart showing processing of the smartphone 910 according to this embodiment.

In step S1101, the connected device determiner 912 determines the connected input device (DVD player 920). In step S1103, the data format determiner 313 determines whether input processing of the DVD player 920 is executable by the smartphone. If the processing is possible in the smartphone, the process advances to step S1107. If the processing is impossible in the smartphone, the transmitter 316 transmits authentication data to the cloud server 230 to cause the virtual PC 330*a* to execute the connection processing on behalf in step S1105. In step S1107, the smartphone 910 acquires content data from the DVD player 920.

According to this embodiment, when an input device is connected via the communication interface, it is determined whether the DVD player 920 serving as an input device is a device processable by the smartphone. Upon determining that the DVD player 920 is not a device that transmits data processable by the smartphone, the smartphone requests the cloud server 230 to convert the data format of the data received from the DVD player 920 into a data format processable by the smartphone. In response to the request, the cloud server 230 converts the data format of the data into a data format processable by the smartphone. With this processing, even if data output from the DVD player 920 has a data format that cannot be output to the USB display 240, the smartphone 910 can request the cloud server 230 to convert the data format. Hence, a DVD video can freely be displayed on a large display only by connecting a mobile phone such as a smartphone carried by the user.

[Fourth Embodiment]

An information processing system 902 according to the fourth embodiment of the present invention will be described next with reference to FIGS. 9B, 10, and 11. FIG. 9B is a block diagram for explaining the arrangement of the information processing system 902 according to this embodiment. The information processing system 902 according to this embodiment is different from the third embodiment in that the input device is a memory card 930. The rest of the components and operations is the same as in the third embodiment when the input device is replaced with the memory card 930. The same reference numerals as in the third embodiment denote the same components and operations, and a detailed description thereof will be omitted.

According to this embodiment, an image, video, or data in an SD card can freely be displayed on a large display only by inserting the SD card serving as a memory card in a mobile phone such as a smartphone carried by the user.

[Fifth Embodiment]

Figure 12:
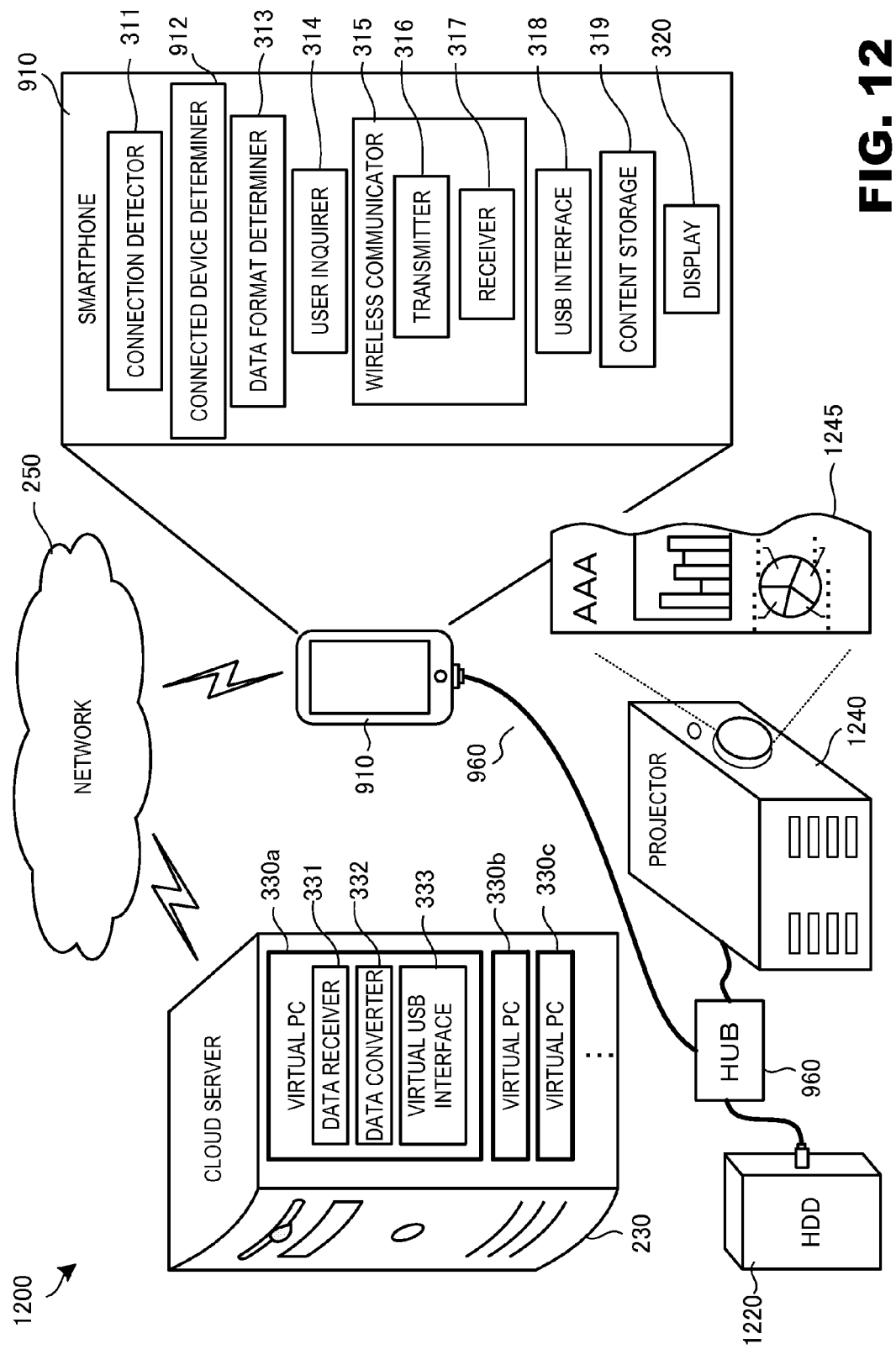
FIG. 12 is a block diagram showing the arrangement of an information processing system according to the fifth embodiment of the present invention.

An information processing system 1200 according to the fifth embodiment of the present invention will be described next with reference to FIG. 12. FIG. 12 is a block diagram for explaining the arrangement of the information processing system 1200 according to this embodiment. The information processing system 1200 according to this embodiment is different from the third embodiment in that the input device is an HDD 1220, and the output device is a projector 1240. The rest of the components and operations is the same as in the third embodiment when the input device is replaced with the HDD 1220, and the output device is replaced with the projector 1240. The same reference numerals as in the third embodiment denote the same components and operations, and a detailed description thereof will be omitted.

According to this embodiment, even if the HDD 1220 holds data that cannot be output to the projector 1240, a smartphone 910 can request the server to convert the data format. Hence, data in the HDD 1220 can freely be displayed on a large screen 1245 only by connecting a mobile phone such as the smartphone 910 carried by the user to the HDD and the projector.

[Sixth Embodiment]

Figure 13:
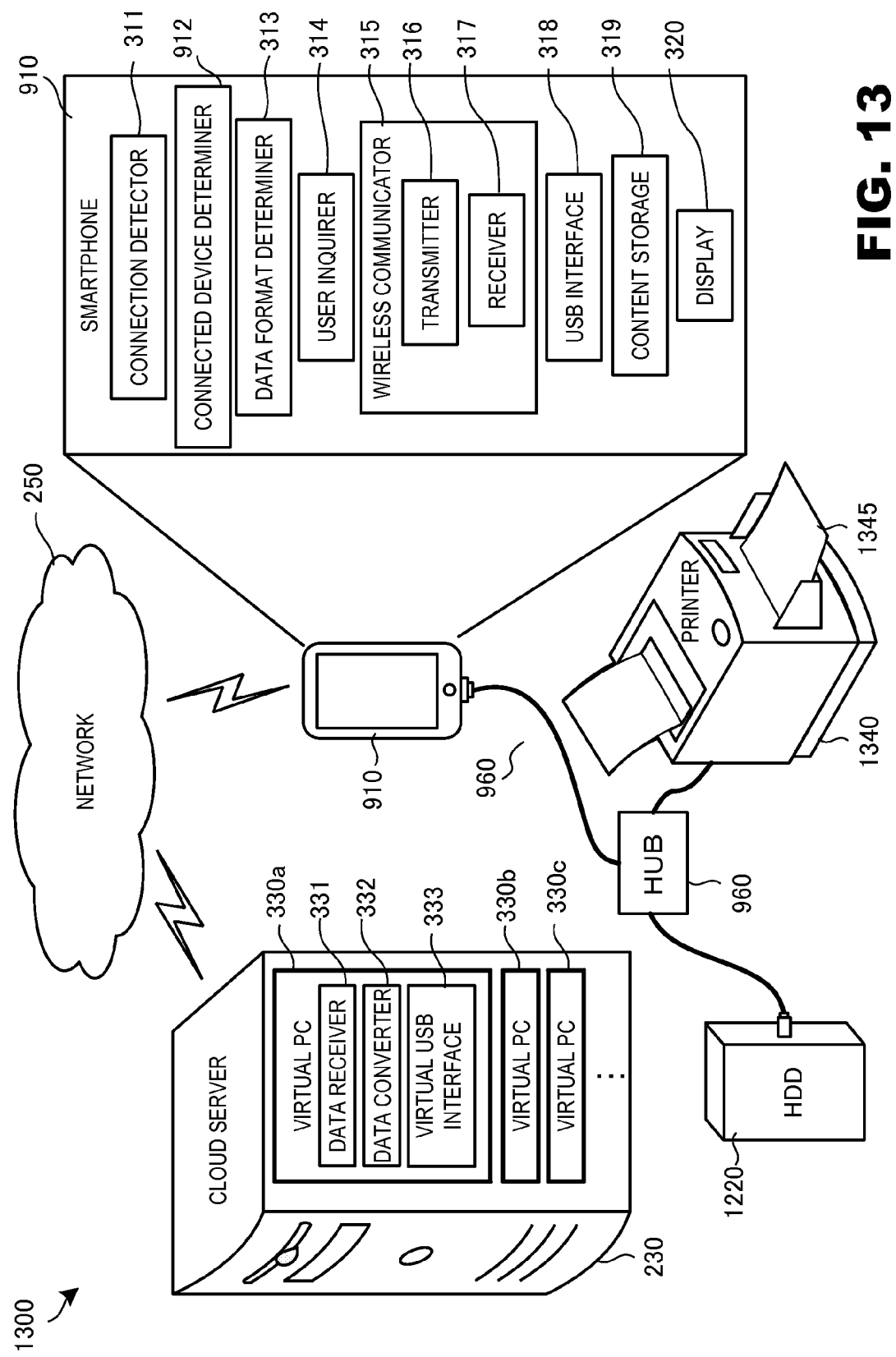
FIG. 13 is a block diagram showing the arrangement of an information processing system according to the sixth embodiment of the present invention.

An information processing system 1300 according to the sixth embodiment of the present invention will be described next with reference to FIG. 13. FIG. 13 is a block diagram for explaining the arrangement of the information processing system 1300 according to this embodiment. The information processing system 1300 according to this embodiment is different from the third embodiment in that the input device is an HDD 1220, and the output device is a printer 1340. The rest of the components and operations is the same as in the third embodiment when the input device is replaced with the HDD 1220, and the output device is replaced with the printer 1340. The same reference numerals as in the third embodiment denote the same components and operations, and a detailed description thereof will be omitted.

According to this embodiment, data in the HDD 1220 can freely be printed as a printed product 1345 only by connecting a mobile phone such as a smartphone 910 carried by the user.

[Seventh Embodiment]

Figure 14:
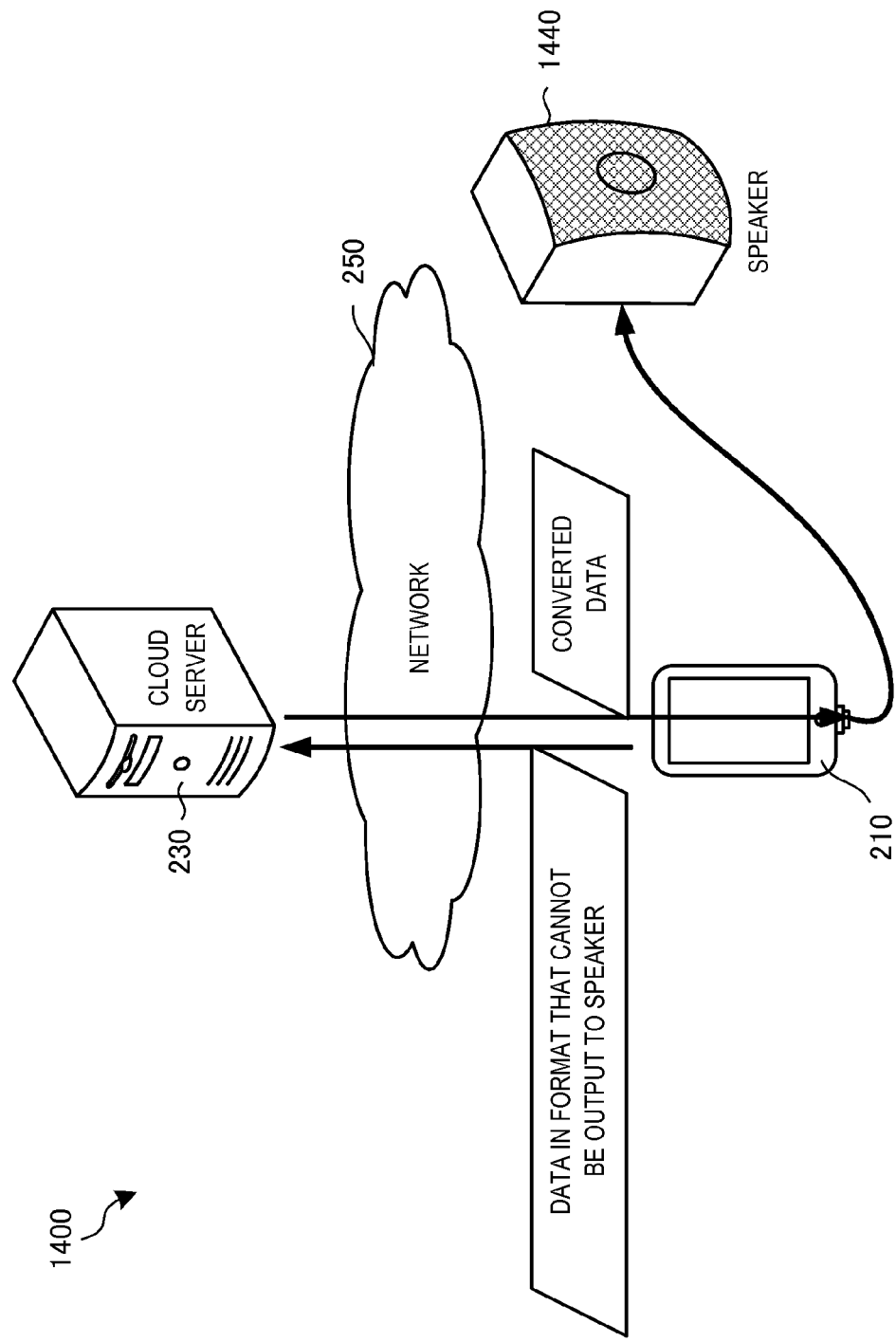
FIG. 14 is a block diagram showing the arrangement of an information processing system according to the seventh embodiment of the present invention.

An information processing system 1400 according to the seventh embodiment of the present invention will be described next with reference to FIG. 14. FIG. 14 is a block diagram for explaining the arrangement of the information processing system 1400 according to this embodiment. The information processing system 1400 according to this embodiment is different from the second embodiment in that the output device is a speaker 1440. The rest of the components and operations is the same as in the second embodiment when the output device is replaced with the speaker 1440. The same reference numerals as in the second embodiment denote the same components and operations, and a detailed description thereof will be omitted.

According to this embodiment, when holding data that cannot be output from the speaker 1440, a smartphone 210 can request the cloud server to convert the data format. Hence, audio output from a variety of speakers 1440 can freely be done only by connecting a mobile phone such as the smartphone 210 carried by the user.

[Eighth Embodiment]

An information processing system 1500 according to the eighth embodiment of the present invention will be described next with reference to FIG. 15. FIG. 15 is a block diagram for explaining the arrangement of the information processing system 1500 according to this embodiment. The information processing system 1500 according to this embodiment is different from the second embodiment in that the output device is a robot 1540. The rest of the components and operations is the same as in the second embodiment when the output device is replaced with the robot 1540. The same reference numerals as in the second embodiment denote the same components and operations, and a detailed description thereof will be omitted.

According to this embodiment, the robot 1540 can freely be controlled only by connecting a mobile phone such as a smartphone 210 carried by the user. The help of the cloud server may be obtained to control a vehicle such as an automobile in place of the robot 1540 by connecting a smartphone to the vehicle, as in this embodiment.

[Ninth Embodiment]

An information processing system 1600 according to the ninth embodiment of the present invention will be described next with reference to FIG. 16. FIG. 16 is a block diagram for explaining the arrangement of the information processing system 1600 according to this embodiment. The information processing system 1600 according to this embodiment is different from the second embodiment in that the output device includes a plurality of USB displays 1640a to 1640c. At this time, when one smartphone 1610a is to output a video to the plurality of USB displays 1640a to 1640c via a hub, a cloud server 230 detects the state of the line. Upon determining that the communication capability is short with the one smartphone 1610a, the cloud server 230 displays a message "Troubles may occur in display because of insufficient line capability. Will you use additional mobile phone?" on the screen of the smartphone 1610a. To obtain smooth display on the plurality of USB displays 1640a to 1640c, the user connects other mobile phones (smartphones 1610b and 1610c here) and causes them to log in to the cloud server 230. The cloud server 230 recognizes the newly connected smartphones 1610b and 1610c, and distributively transmits content data to be displayed to their USB interfaces. That is, the cloud server 230 has the function of a virtual hub and executes distribution processing on behalf of a hub.

The rest of the components and operations is the same as in the second embodiment when the smartphone is replaced with the plurality of smartphones 1610a to 1610c, and the output device is replaced with the plurality of USB displays 1640a to 1640c. The same reference numerals as in the second embodiment denote the same components and operations, and a detailed description thereof will be omitted.

According to this embodiment, image output from a plurality of displays can freely be done only by connecting a mobile phone such as a smartphone carried by the user. The technique of simultaneously connecting a mobile phone to a plurality of output devices as in this embodiment can be combined with any of the above-described third to eighth embodiments.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the above embodiments, a USB has been exemplified. However, the present invention is not limited to this. For example, any other communication interfaces complying with standards such as IEEE1394, IEEE1888, Bluetooth®, Wi-Fi, IrDA, SD, Zigbee®, HDMI, MIDI, SCSI, IDE, RS232C, IEEE488 (GBIB), EIA/RS422, and IEEE1284 are usable.

The present invention is applicable to a system including a plurality of devices or a single apparatus. The present invention is also applicable even when a program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program.

This application claims the benefit of Japanese Patent Application No. 2012-046995 filed on Mar. 2, 2012, which is hereby incorporated by reference herein in its entirety.

The invention claimed is:

1. An information processing system comprising:
a mobile device; and
a server,
wherein the mobile device comprises a memory storing first instructions and a first processor configured to execute the first instructions to:
determine, when a second device is connected via a communication interface, whether the mobile device can control the second device;
request, when it is determined that the mobile device cannot control the second device, the server connected via a wireless communication network to control the second device;
control signal transfer, in accordance with a protocol of the communication interface between the server and the second device via the wireless communication network and the communication interface, so that the server can control the second device via a communication established between the server and the second device; and
wherein the server comprises a second memory storing second instructions and a processor configured to execute the instructions to:
establish the communication with the second device; and
control the second device, in accordance with the protocol of the communication interface via the wireless communication network, the control signal transfer, and the communication interface in response to the request.

2. The information processing system according to claim 1, wherein:
the mobile device further comprises a storage, associated with the control signal transfer, that stores data acquired from the second device in accordance the protocol of the communication interface, and
the first processor is further configured to execute the first instructions to perform at least a part of the protocol until the communication between the server and the second device has been established.

3. The information processing system according to claim 1, wherein the first processor is further configured to execute the first instructions to:
perform, when it is determined that the mobile device cannot control the second device, disconnection processing for communication with the second device via the communication interface; and
request the server connection processing between the server and the second device;
wherein the second processor of the server is configured to execute the second instructions to establish the communication between the server and the second device in accordance with the protocol of the communication interface via the wireless communication network, the control signal transfer, and the communication interface.

4. The information processing system according to claim 3, wherein the second processor of the server is configured to execute the second instructions to provide a virtual personal computer including a virtual communication interface, the virtual communication interface establishing the communication between the server and the second device.

5. The information processing system according to claim 1, wherein the first processor is further configured to execute the first instructions to:
determine, when the second device is connected via the communication interface, whether the second device can process output data transmitted from the mobile device,
transmit, when it is determined that the second device cannot process the output data transmitted from said mobile device, the output data to the server and request the server to convert the transmitted output data into a format processable by the second device, and
the second processor of the server is configured to convert, in response to the request, the transmitted output data into the format.

6. The information processing system according to claim 1, wherein the communication interface uses a Universal Serial Bus (USB), and the first processor is further configured to execute the first instructions to determine, based on a device descriptor received from the second device in a setup stage, whether the mobile device can control the second device.

7. The information processing system according to claim 6, wherein the mobile device is further configured to execute the first instructions to designate a network address and request the server to supply output data stored at the network address a format acceptable by second device.

8. The information processing system according to claim 1, wherein the first processor is further configured to execute the first instructions to:
    determine, when the second device is connected via the communication interface, whether the second device that transmits input data processable by the mobile device; and
    transmit, when it is determined that the second device does not transmits the input data processable by said mobile device, a request to the server to convert the input data into a format processable by the mobile phone, and
    the server is further configured to execute the second instructions to convert, in response to the request, the transmitted input data into the format processable by said mobile device.

9. The information processing system according to claim 1, wherein the second device comprises an output device including at least one of a display, a projector, a printer, a speaker, a vehicle, and a robot.

10. The information processing system according to claim 1, wherein the communication interface complies with one standard out of USB, IEEE1394, IEEE1888, Bluetooth®, Wi-Fi, IrDA, SD, Zigbee®, HDMI, MIDI, SCSI, IDE, RS232C, IEEE488 (GBIB), EIA/RS422, and IEEE1284.

11. The information processing system according to claim 1, wherein the second device includes an input device including at least one of a DVD player, a memory card, and HDD.

12. A mobile device comprising:
    a communication interface;
    a memory storing instructions; and
    a processor configured to execute the instructions to:
        determine, when a second device is connected via the communication interface, whether the mobile device can control the second device;
        request, when it is determined that the mobile device cannot control the second device, the server connected via a wireless communication network to control the second device; and
        control signal transfer, in accordance with a protocol of the communication interface between the server and the second device and via the wireless communication network and the communication interface, so that the server can control the second device via a communication established between the server and the second device.

13. A method of controlling a mobile device, the method comprising:
    determining, when the a second device is connected via a communication interface, whether the mobile device can control the second device;
    requesting, when it is determined that the mobile device cannot control the second device, a server connected via a wireless communication network to control the second device; and
    controlling signal transfer, in accordance with a protocol of the communication interface between the server and the second device and via the wireless communication network and the communication interface, so that the server can control the second device via a communication established between the server and the second device.

14. A non-transitory computer-readable storage medium storing a program of a mobile device, the program, when executed by a computer causes the computer to execute a method, the method comprising:
    determining, when the a second device is connected via a communication interface, whether the mobile device can control the second device;
    requesting, when it is determined that the mobile device cannot control the second device, a server connected via a wireless communication network control the second device; and
    controlling signal transfer, in accordance with a protocol of the communication interface between the server and the second device and via the wireless communication network and the communication interface, so that the server can control the second device via a communication established between the server and the second device.

15. An information processing method of a server connected to a wireless communication network, the method comprising:
    receiving, via the wireless communication network when a mobile device determines that the mobile device cannot control a second device connected to the mobile device via a communication interface, a request to control the second device;
    establishing, in response to the request, communication with the second device via the wireless communication network and in accordance with a protocol of the communication interface; and
    controlling the second device, via the communication interface of the mobile device over the wireless communication network, and in accordance with the protocol of the communication interface.

16. The information processing method of claim 15, wherein the method further includes:
    receiving, from the mobile device over the wireless communication network, output data;
    convert, in response to the request, the output data from a first format into a second format the second device is configured to process; and
    wherein controlling the second device includes providing, via the communication interface of the mobile device over the wireless network, the converted output data to the second device.

17. A non-transitory computer-readable storage medium storing a program that, when executed by a server connected to a wireless communication network, cause the server to perform an information processing method, the method comprising:
    receiving, via the wireless communication network when a mobile device determines that the mobile device cannot control a second device connected to the mobile device via a communication interface, a request to control the second device;
    establishing, in response to the request, communication with the second device via the wireless communication network and in accordance with a protocol of the communication interface; and
    controlling the second device, via the communication interface of the mobile device over the wireless communication network, and in accordance with the protocol of the communication interface.

18. The non-transitory computer-readable storage medium of claim 17, wherein the method further includes:
    receiving, from the mobile device over the wireless communication network, output data;
    convert, in response to the request, the output data from a first format into a second format the second device is configured to process; and wherein controlling the second device includes providing, via the communication interface of the mobile device over the wireless network, the converted output data to the second device.

19. A server connected to a wireless communication network, the server comprising:
a memory storing instructions; and
a processor configured to execute the instructions to:
receive, via the wireless communication network when a mobile device determines that the mobile device cannot control a second device connected to the mobile device via a communication interface, a request to control the second device;
establish, in response to the request, communication with the second device via the wireless communication network and in accordance with a protocol of the communication interface; and
control second device, via the communication interface of the mobile device over the wireless communication network, and in accordance with the protocol of the communication interface.

20. The server of claim 19, wherein the processor is further configured to execute the instructions to:
receive, from the mobile device over the wireless communication network, output data;
convert, in response to the request, the output data from a first format into a second format the second device is configured to process; and
wherein, to control the second device, the server is configured to execute the instructions to provide, via the communication interface of the mobile device over the wireless network, the converted output data to the second device.

* * * * *

UNITED STATES PATENT AND TRADEMARK OFFICE
CERTIFICATE OF CORRECTION

PATENT NO.         : 9,326,115 B2
APPLICATION NO.    : 14/382417
DATED              : April 26, 2016
INVENTOR(S)        : Yoshikazu Kobayashi Page 1 of 1

It is certified that error appears in the above-identified patent and that said Letters Patent is hereby corrected as shown below:

In the Claims

Claim 2, col. 16, line 19, "in accordance the protocol of" should read -- in accordance with the protocol of --.

Claim 13, col. 17, line 53, "determining, when the a second device" should read -- determining, when a second device --.

Claim 14, col. 18, line 3, "determining, when the a second device" should read -- determining, when a second device --.

Signed and Sealed this
Twenty-eighth Day of June, 2016

Michelle K. Lee
*Director of the United States Patent and Trademark Office*